United States Patent
Onkarappa et al.

(10) Patent No.: US 11,857,901 B2
(45) Date of Patent: Jan. 2, 2024

(54) EXPANSION MEMBRANE ASSEMBLY AND FILTER HEAD IN EXHAUST FLUID FILTER ASSEMBLY

(71) Applicant: CUMMINS FILTRATION IP, INC., Columbus, IN (US)

(72) Inventors: Bharath Siddaramanna Onkarappa, Shimoga (IN); Mrinmayee Balasaheb Pokharkar, Pune (IN); Nilesh Bhaskar Nagare, Pune (IN); Nilay Shah, Pune (IN); Christopher E. Holm, Madison, WI (US); Frank Wolfgang Becker, Friendship, WI (US); Santoshini Choudhary, Bengaluru (IN)

(73) Assignee: CUMMINS FILTRATION IP, INC., Columbus, IN (US)

(*) Notice: Subject to any disclaimer, the term of this patent is extended or adjusted under 35 U.S.C. 154(b) by 0 days.

(21) Appl. No.: 17/563,552

(22) Filed: Dec. 28, 2021

(65) Prior Publication Data
US 2022/0118385 A1   Apr. 21, 2022

Related U.S. Application Data

(63) Continuation of application No. PCT/US2020/040222, filed on Jun. 30, 2020.

(60) Provisional application No. 62/869,232, filed on Jul. 1, 2019.

(51) Int. Cl.
*B01D 35/30* (2006.01)
*B01D 29/00* (2006.01)
*B01D 29/15* (2006.01)

(52) U.S. Cl.
CPC ......... *B01D 35/30* (2013.01); *B01D 29/0093* (2013.01); *B01D 29/15* (2013.01); *B01D 2201/304* (2013.01); *B01D 2201/4053* (2013.01)

(58) Field of Classification Search
CPC .............. B01D 35/30; B01D 2201/304; B01D 2201/307
See application file for complete search history.

(56) References Cited

U.S. PATENT DOCUMENTS

| | | | |
|---|---|---|---|
| 4,642,183 A | 2/1987 | Hebert | |
| 4,648,971 A | 3/1987 | Pabst | |
| 5,364,528 A * | 11/1994 | Schwarz | B01D 29/114 210/453 |
| 5,489,385 A | 2/1996 | Raabe et al. | |

(Continued)

FOREIGN PATENT DOCUMENTS

| | | |
|---|---|---|
| DE | 20 2007 002 785 U1 | 4/2008 |
| DE | 11 2006 003 021 T5 | 10/2008 |

(Continued)

OTHER PUBLICATIONS

International Search Report and Written Opinion issued for PCT Application No. PCT/US2020/040222 dated Oct. 2, 2020, 14 pages.

*Primary Examiner* — Benjamin M Kurtz
(74) *Attorney, Agent, or Firm* — Foley & Lardner LLP

(57) ABSTRACT

A filter assembly comprises a housing, a filter element for filtering a fluid and positionable within the housing, and an expansion membrane assembly. The expansion membrane assembly fluidly separates and is positionable between the housing and the filter element. The membrane assembly extends along an inner surface, a top surface, and an outer surface of the housing.

22 Claims, 14 Drawing Sheets

(56) References Cited

U.S. PATENT DOCUMENTS

| | | | |
|---|---|---|---|
| 5,919,362 A * | 7/1999 | Barnes | B01D 35/30 |
| | | | 210/441 |
| 7,481,319 B2 | 1/2009 | Jokschas et al. | |
| 7,513,373 B2 | 4/2009 | Kramer | |
| 8,114,299 B2 | 2/2012 | Verdegan et al. | |
| 2005/0077230 A1 | 4/2005 | Guenter et al. | |
| 2005/0161394 A1 | 7/2005 | Fritze et al. | |
| 2006/0219626 A1* | 10/2006 | Dworatzek | B01D 29/21 |
| | | | 210/450 |
| 2008/0203010 A1* | 8/2008 | Kraft | F02M 37/32 |
| | | | 210/500.1 |
| 2008/0210618 A1 | 9/2008 | Kiedaisch et al. | |
| 2010/0181246 A1 | 7/2010 | Kiedaisch et al. | |
| 2013/0001125 A1* | 1/2013 | Zachovalova | B01D 35/30 |
| | | | 206/524.2 |
| 2013/0126416 A1 | 5/2013 | Weindorf et al. | |
| 2015/0008172 A1 | 1/2015 | Kocksch | |
| 2015/0014237 A1 | 1/2015 | Kocksch | |
| 2016/0237965 A1 | 8/2016 | Kerrin | |
| 2019/0240602 A1 | 8/2019 | Malgorn et al. | |
| 2020/0398199 A1* | 12/2020 | Raupp | F01N 3/0211 |

FOREIGN PATENT DOCUMENTS

| | | |
|---|---|---|
| DE | 10 2009 023 951 B3 | 1/2011 |
| DE | 10 2010 027 069 B3 | 2/2012 |
| DE | 10 2012 003 156 B4 | 2/2016 |
| EP | 0 501 851 A1 | 9/1992 |
| EP | 1 649 914 A1 | 4/2006 |
| EP | 1 510 239 B1 | 11/2008 |
| EP | 2 489 845 A1 | 8/2012 |
| EP | 2 854 987 A1 | 4/2019 |
| WO | WO-2013/178352 A1 | 12/2013 |
| WO | WO-2018/134625 A1 | 7/2018 |

\* cited by examiner

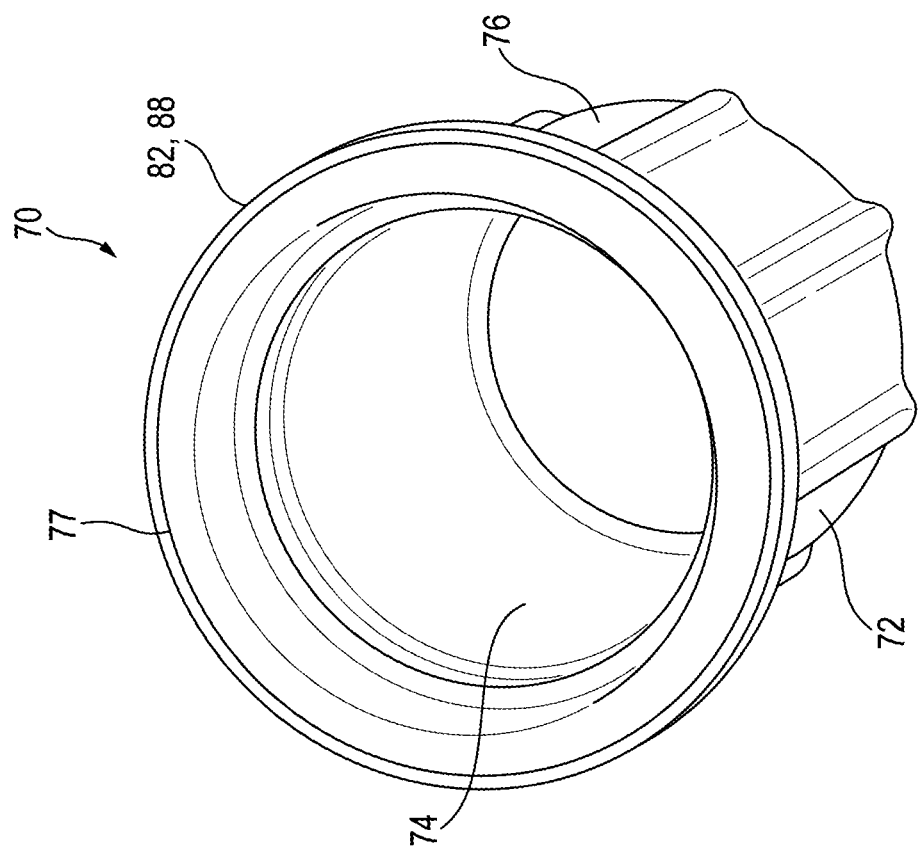
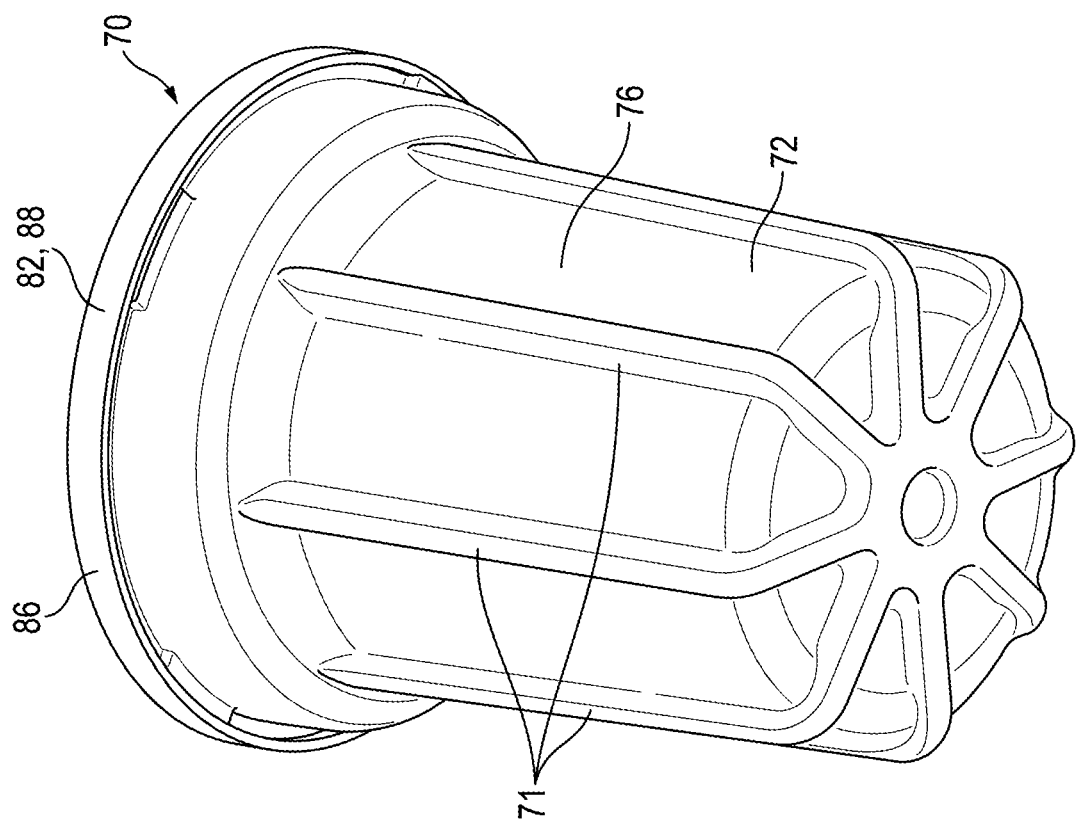

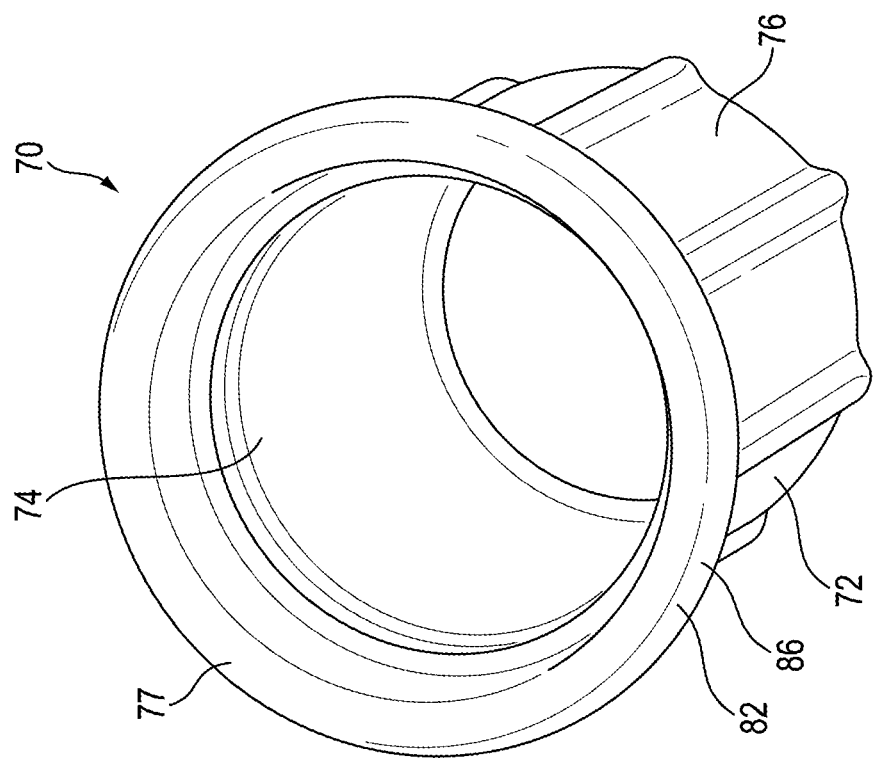
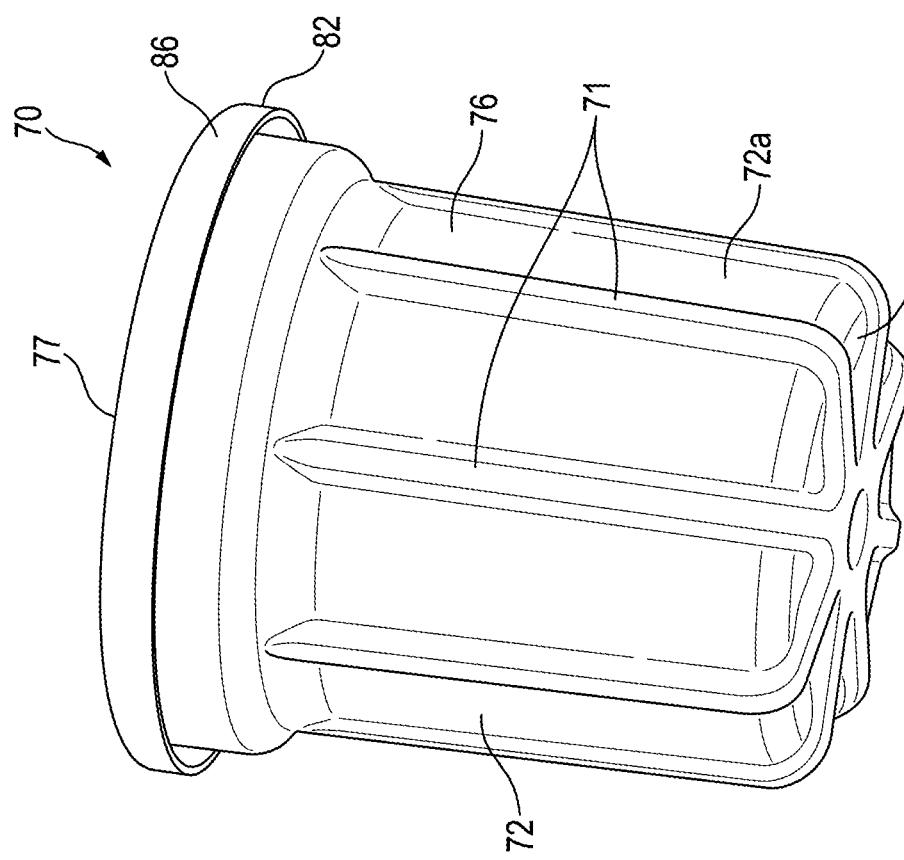
FIG. 8B
FIG. 8A

| Pressure in bar | % volume expansion |
|---|---|
| 0 | 0.000 |
| 0.25 | 6.771 |
| 0.5 | 14.379 |
| 1 | 31.367 |
| 1.5 | 36.692 |
| 2 | 38.744 |
| 3 | 40.504 |
| 4 | 41.375 |
| 5 | 42.826 |

EXPANSION MEMBRANE ASSEMBLY AND FILTER HEAD IN EXHAUST FLUID FILTER ASSEMBLY

CROSS REFERENCE TO RELATED APPLICATIONS

This application is continuation of PCT Application No. PCT/US2020/040222 filed Jun. 30, 2020, which claims priority to and the benefit of U.S. Provisional Patent Application No. 62/869,232, filed Jul. 1, 2019. The contents of these applications are incorporated herein by reference in their entirety and for all purposes.

FIELD

The present application relates generally to an expansion membrane assembly for use with exhaust fluid filter assemblies.

BACKGROUND

Liquid diesel exhaust fluid (DEF) is used in aftertreatment systems to facilitate the conversion of nitrous oxide ($N_2O$) into nitrogen gas and water. However, DEF inherently expands in volume by approximately 8% when exposed to a temperature of approximately −11° C. or less. Accordingly, filter assemblies that are used with DEF have to account for this expansion by design.

In order to account for the expansion of DEF, a conventional filter assembly 110 may have a membrane 170 and polyurethane foam 112 positioned between the filter element 120 and the housing 130, as shown in FIG. 1. The membrane 170 works as a separation layer between the DEF and the foam 112 by forming a seal at its interfaces with the housing 130 and the filter head 150. The membrane 170 also helps compress the foam 112 when the DEF expands (at a temperature of approximately −11° C. or below).

The filter assembly 110 also includes an air vent 131 that allows air from the foam 112 to be vented out of the housing 130 (and the entire filter assembly 110) when the foam 112 is compressed due to the expansion of DEF at a temperature of approximately −11° C. or below. The air vent 131 thereby prevents back pressure buildup inside the filter assembly 110.

SUMMARY

Various embodiments provide for a filter assembly comprising a housing, a filter element for filtering a fluid and positionable within the housing, and an expansion membrane assembly. The expansion membrane assembly fluidly separates and is positionable between the housing and the filter element. The membrane assembly extends along an inner surface, a top surface, and an outer surface of the housing.

Various other embodiments provide for a method of assembling a filter assembly comprising positioning an expansion membrane assembly at least partially in a housing such that the membrane assembly extends along a housing inner surface, a housing top surface, and a housing outer surface of the housing, and positioning a filter element for filtering a fluid at least partially within the membrane assembly and at least partially within the housing such that the membrane assembly fluidly separates and is positioned between the housing and the filter element.

These and other features (including, but not limited to, retaining features and/or viewing features), together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 6A is a perspective view of the membrane assembly of the filter assembly of FIG. 3A.

FIG. 6B is a perspective view of the membrane assembly of the filter assembly of FIG. 3A.

FIG. 8A is a perspective view of a membrane assembly according to another embodiment.

FIG. 8B is a perspective view of the membrane assembly of FIG. 8A.

DETAILED DESCRIPTION

Referring to the figures generally, various embodiments disclosed herein relate to an integrated expansion membrane assembly for a filter assembly which form at least one seal together. The membrane assembly, in particular, helps counter the expansion of the diesel exhaust fluid (DEF) by providing extra volume within the filter assembly for the expanded volume of DEF at low temperatures (e.g., at approximately −11° C. and below). The membrane assembly also protects the various structural components within the filter assembly from the load that arises due to the DEF volume expansion.

As described further herein, the membrane assembly forms seals with both the filter head and the housing of the filter assembly, which prevents any DEF leakage to the external environment of the filter assembly (or to the threaded interface between the filter head and the housing). Furthermore, the membrane assembly is lockable onto the housing. The filter assembly creates multiple sealing regions in order to prevent any leakage, even in high pressure.

Filter Assembly

Figure 1:
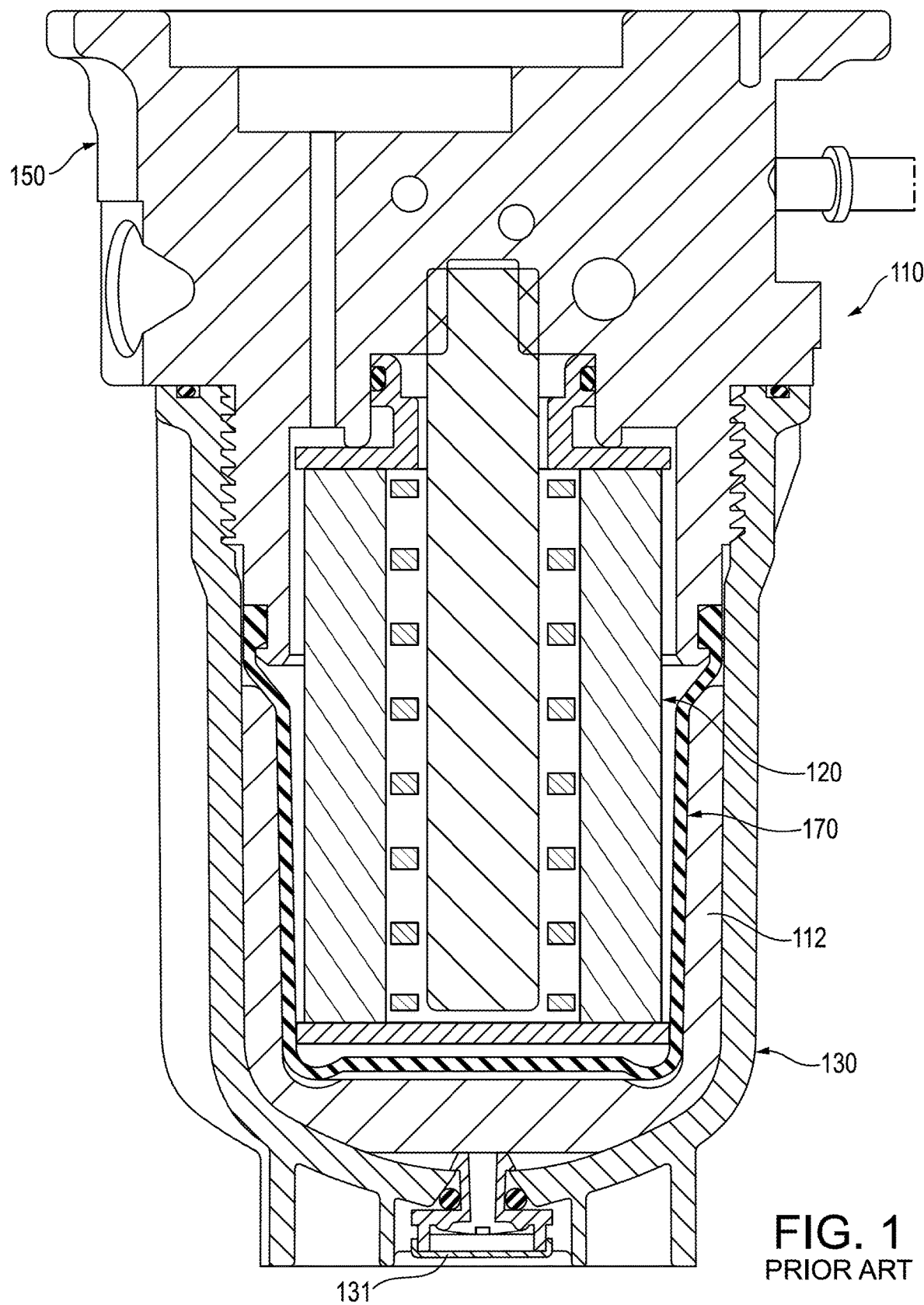
FIG. 1 is a cross-sectional view of a conventional filter assembly.
Figure 2:
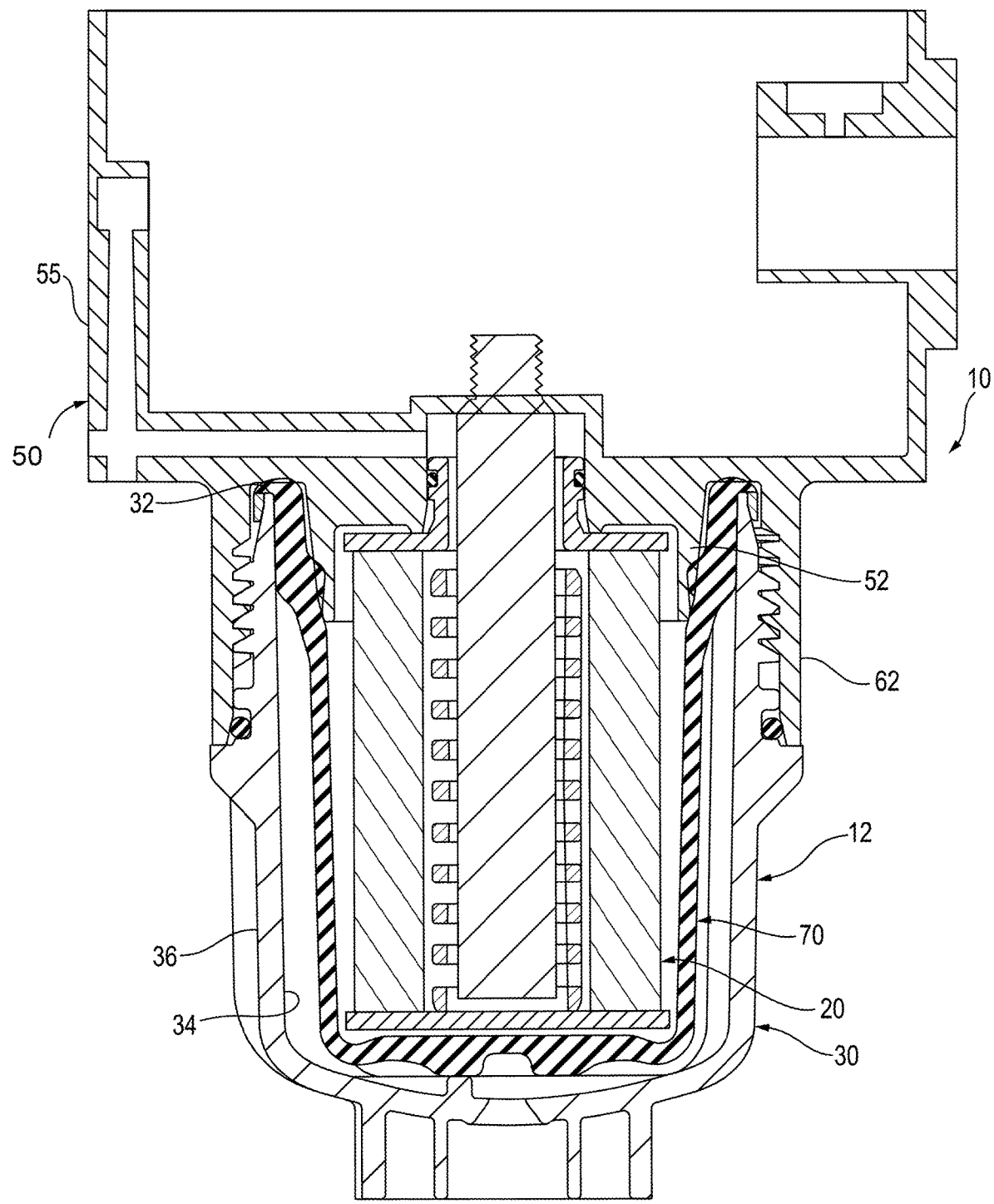
FIG. 2 is a cross-sectional view of a filter assembly according to one embodiment.
Figure 3A:
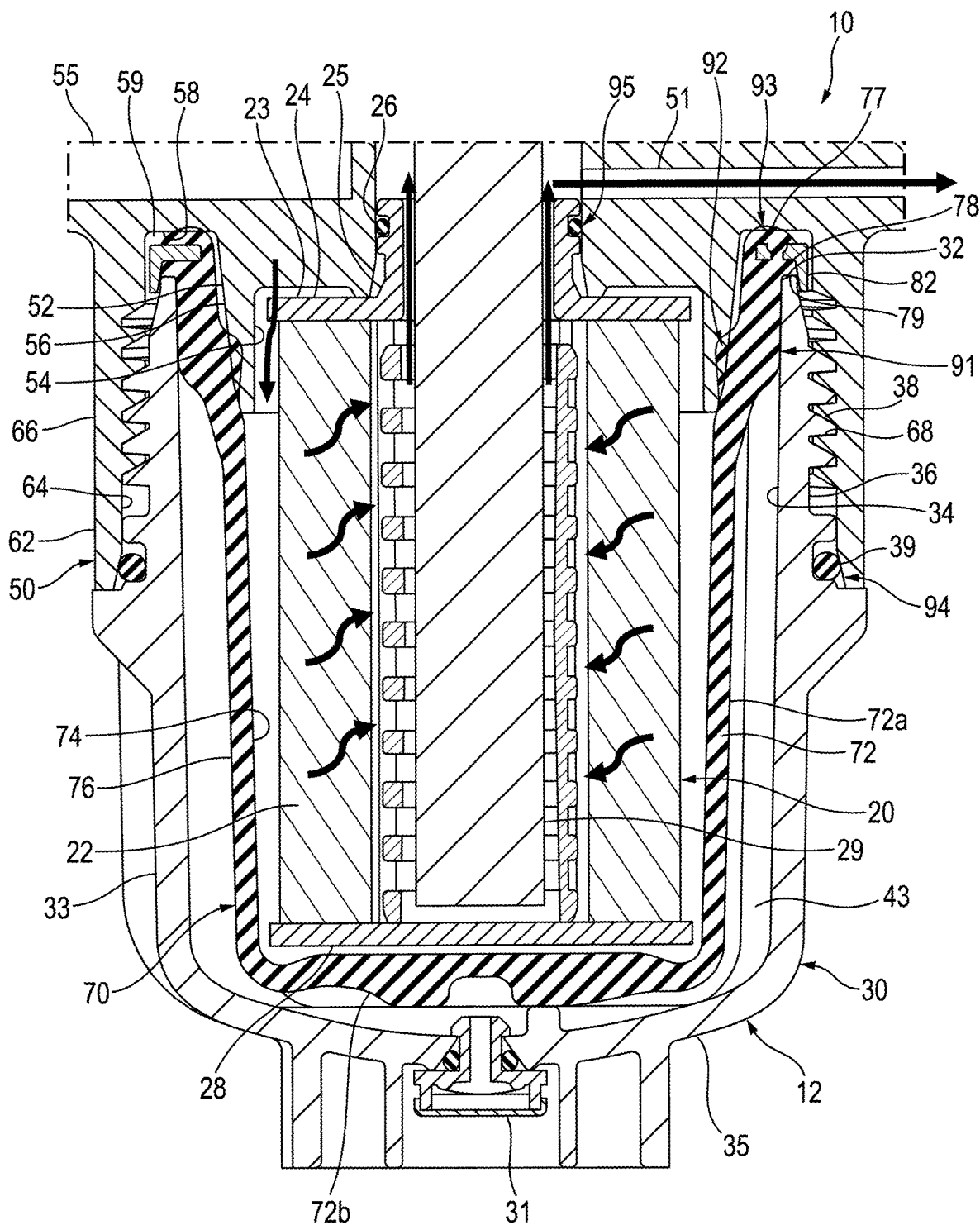
FIG. 3A is a cross-sectional view of a filter assembly according to another embodiment.

As shown in FIG. 2, the filter assembly 10 comprises a filter cartridge 12 and a filter head 50. The filter cartridge 12 comprises a filter element 20, a housing 30, and a membrane assembly 70. The various elements of the filter assembly 10 form seals together through multiple sealing interfaces or regions (e.g., first, second, third, fourth, and fifth sealing interfaces or regions 91, 92, 93, 94, 95, as shown in FIG. 3A and described further herein). The liquid DEF is used to facilitate the conversion of nitrous oxide ($N_2O$) into nitrogen gas and water. As described further herein, the filter assembly 10 is configured to accommodate for the volumetric expansion of DEF at low temperatures (e.g., at a temperature of approximately −11° C. or less).

As described further herein, the membrane assembly 70 extends along the housing inner surface 34, the housing top surface 32, and the housing outer surface 36 of the housing 30 in order to completely and securely form at least one seal with the housing 30, even under pressure when the DEF expands. The filter head 50 comprises an inner extension 52 and an outer extension 62 (as described further herein) further forming at least one seal with the membrane assembly 70 and secure seals formed between the membrane assembly 70 and the housing 30.

Filter Element

The filter element 20 is configured to filter a fluid and is positioned and housed at least partially (and optionally completely) within the housing 30 and the membrane assembly 70 (in particular within a membrane body 72 of the membrane assembly 70), which is positioned at least partially within the housing 30. Accordingly, at least a portion of the axial length of the filter element 20 is radially surrounded by the membrane side wall 72a of the membrane body 72 of the membrane assembly 70. The bottom of the filter element 20 is surrounded by the membrane bottom wall 72b of the membrane body 72. As shown in FIG. 3A, the filter element 20 comprises a filter media 22 (for filtering the fluid), a top endplate 24, and a bottom endplate 28. The filter media 22 may define an inner area that can receive another portion of the filter assembly 10, such as a center tube 29.

The top endplate 24 and the bottom endplate 28 are positioned along opposite ends of the filter media 22. The bottom endplate 28 is positioned completely within the membrane body 72 of the membrane assembly 70. The top endplate 24 may be positioned completely or partially within an inner region defined by the membrane body 72 of the membrane assembly 70. The top endplate 24 defines a central aperture that allows filtered fluid to flow out of (or unfiltered fluid to flow into, depending on the desired configuration) the inner area of the filter element 20 and is configured to receive the center tube 29 extending into the inner area of the filter media 22. The bottom endplate 28 may be completely closed in order to prevent fluid from flowing through the bottom endplate 28 (into or from the inner area of the filter element 20).

As shown in FIG. 3A, the top endplate 24 extends comprises a base 23 and an inner extension 25. The base 23 extends radially along the top end of the filter media 22. The inner extension 25 is positioned along the inner radius of the base 23 and extends axially from the base 23 in a direction away from the filter media 22. Accordingly, the inner extension 25 extends vertically above the filter media 22 and into a portion of the outlet 51 of the filter head 50. The inner extension 25 extends along and further defines the central aperture of the top endplate 24. Accordingly, fluid can flow through the inner extension 25 (from within the filter media 22 and into the outlet 51, for example). The inner extension 25 comprises a groove (along the outer surface of the inner extension 25) and a seal member 26 (e.g., an o-ring) positioned within the groove extending around the outer perimeter of the inner extension 25 of the top endplate 24. The seal member 26 is configured to fluidly form a seal with a portion of the filter head 50 (such as the walls of the outlet 51 of the filter head 50) about the entire circumference of the inner extension 25 of the top endplate 24, thereby creating a sealing region (referred to herein as the "fifth sealing region 95") between the outer surface of the inner extension 25 of the top endplate 24 of the filter element 20 and a portion of the filter head 50. The fifth sealing region 95 prevents fluid from flowing between the clean or filtered side of the filter element 20 and the dirty or unfiltered side of the filter element 20.

Filter Housing

As shown in FIG. 3A, the filter shell or housing 30 is defined by an axially-extending, circumferential housing side wall 33 and a radially-extending housing bottom wall or base 35 that are configured to house or contain at least a portion of the membrane assembly 70 and the filter element 20. The base 35 extends in a radially direction beneath the membrane assembly 70. The housing side wall 33 of the housing 30 extends axially from a top surface of the base 35 and extends around the entire circumference of the base 35 (circumferentially and axially surrounding the membrane body 72). The housing side wall 33 is configured to attach to the filter head 50. The housing side wall 33 and the base 35 are constructed as a single, continuous piece. Accordingly, the housing 30 comprises a single unitary component that cannot be separated without destruction.

The housing side wall 33 of the housing 30 includes a housing inner surface 34 (which faces radially inward, directly toward the outer surface 76 of the membrane body 72), a housing outer surface 36 (which faces radially outward and is opposite the housing inner surface 34), and a housing top surface 32 (which extends radially between and connects the housing inner surface 34 and the housing outer surface 36). The housing top surface 32 is the top axial end of the housing 30. The housing outer surface 36 comprises threads 38 that are configured to threadably attach to the threads 68 on the inner surface 64 of the outer extension 62 of the filter head 50, as shown in FIG. 3A.

The housing outer surface 36 comprises a groove and a seal member 39 (e.g., an o-ring) positioned within the groove extending around the outer perimeter of the housing 30. The seal member 39 is configured to fluidly form a seal with the inner surface 64 of the outer extension 62 of the filter head 50 (as described further herein) about the entire outer circumference of the housing 30 and the entire inner circumference of the filter head 50, thereby creating another sealing region (referred to herein as the "fourth sealing region 94") between the housing outer surface 36 of the housing 30 and the inner surface 64 of the outer extension 62 of the filter head 50. The fourth sealing region 94 prevents debris from accumulating on or entering into the threaded interface between the threads 38 on the housing outer surface 36 and the threads 68 on the inner surface 64 of the outer extension 62 of the filter head 50.

As shown in FIG. 3A, the housing 30 comprises an air vent 31 (positioned in and extending through an aperture defined by the base 35 of the housing 30) in order to allow air to escape and vent from within the housing 30 when the DEF volumetrically expands, which provides more space within the inner area 43 of the housing 30 (as described further herein) for the membrane assembly 70 to move and expand into, thereby preventing back pressure from developing within the filter assembly 10. However, according to other embodiments, the housing 30 may not include any air vent (and accordingly the base 35 may not define an aperture for the air vent 31), and the membrane assembly 70 and the air within the inner area 43 of the housing 30 are simply compressed when the DEF expands in order to reduce cost and complexity.

Filter Head

As shown in FIG. 3A, the housing 30 is configured to threadably attach with the filter head 50. The filter head 50 comprises an inlet and an outlet 51 in order to allow fluid (in particular DEF) to enter into the filter assembly 10 through the inlet (to the dirty, unfiltered side of the filter element 20), flow into and through the filter element 20, and exit from the filter assembly 10 through the outlet 51 (from the clean, filtered side of the filter element 20). Depending on the desired configuration, the inlet and the outlet 51 may be switched (thus reversing the direction of fluid flow through the filter assembly 10). The filter head 50 may optionally comprise or attach to a pump housing.

The filter head 50 comprises a base 55 positioned axially above at least a portion of the filter cartridge 12 (in particular above the housing 30 and the membrane assembly 70). In order to securely attach to the housing 30 and form at least one seal with the membrane assembly 70, the filter head 50 comprises an inner extension 52 and an outer extension 62 extending axially downwardly from the base 55 of the filter head 50 in a direction toward the base 35 of the housing 30 and the base of the membrane body 72 and in substantially the same direction (i.e., the inner extension 52 and the outer extension 62 are substantially parallel in the axial direction and extend along a portion of opposite sides of the housing side wall 33 of the housing 30, toward the base 35 of the housing 30). The inner extension 52 and the outer extension 62 extend radially about the entire perimeter of the filter head 50 and extend along at least a portion of the axial length of the filter cartridge 12 (in particular the housing 30 and the membrane assembly 70). The inner extension 52 is positioned radially inward from the outer extension 62.

The inner extension 52 is positioned and provided in order to form a seal with the membrane body 72 and to also further form and reinforce a seal between the membrane body 72 and the housing 30. The inner extension 52 comprises an inner surface 54 (which faces radially inward, toward the filter element 20) and an outer surface 56 (which faces radially outward, directly toward the inner surface 74 of the membrane body 72 when assembled) that are opposite each other. When assembled, the inner extension 52 of the filter head 50 is positioned radially between and extends axially along at least a portion of the inner surface 74 of the membrane body 72 of the membrane assembly 70 and the outer surface of the filter element 20 (for example, at least a portion of the filter media 22 and the top endplate 24). The inner extension 52 extends along the entire inner circumference of the membrane assembly 70 and around the entire outer circumference of the filter element 20. As described further herein, the inner extension 52 of the filter head 50 fluidly forms a (inner) seal with the inner surface 74 of the membrane body 72 about the entire outer circumference of the inner extension 52 and the entire inner circumference of the membrane body 72, thereby creating a sealing region (referred to herein as the "second sealing region 92") between the outer surface 56 of the inner extension 52 and the inner surface 74 of the membrane body 72.

The outer extension 62 comprises an inner surface 64 (which faces radially inward, toward the housing 30 and the membrane assembly 70) and an outer surface 66 (which faces radially outward) that are opposite each other. The inner surface 64 of the outer extension 62 comprises threads 68 that are configured to threadably attach to the threads 38 on the housing outer surface 36, as shown in FIG. 3A. When assembled, the outer extension 62 of the filter head 50 is positioned radially outwardly from, extends around the entire outer circumference of, and extends axially along at least a portion of the housing outer surface 36 and the entire outer surface 86 of the lip 82 of the membrane assembly 70 (as described further herein). Furthermore, when assembled, the outer surface 66 of the outer extension 62 forms one of the outermost surfaces of the filter assembly 10.

The filter head 50 further comprises a slot surface 58 radially extending between the inner extension 52 and the outer extension 62. Together, the outer surface 56 of the inner extension 52, the inner surface 54 of the outer extension 62, and the slot surface 58 define a radial gap or slot 59 positioned between and radially spaces apart the inner extension 52 and the outer extension 62. The slot surface 58 is the innermost surface of the slot 59 (along the axial length of the slot 59). The slot 59 extends completely around and along the entire outer surface 56 of the inner extension 52 and completely along the entire inner surface 54 of the outer extension 62.

When the filter assembly 10 is assembled, the slot 59 is configured to receive at least an upper portion of the housing side wall 33 of the housing 30 and at least an upper portion of the membrane assembly 70 (in particular an upper portion of the membrane body 72 and the entire lip 82 of the membrane assembly 70). As described further herein, the slot surface 58 fluidly forms a (top) seal with the top surface 77 of the membrane assembly 70 about the entire top circumference of the membrane assembly 70 and the entire circumference of the slot surface 58, thereby creating a sealing region (referred to herein as the "third sealing region 93") between the top surface 77 of the membrane assembly and the slot surface 58.

Membrane Assembly

Figure 3B:
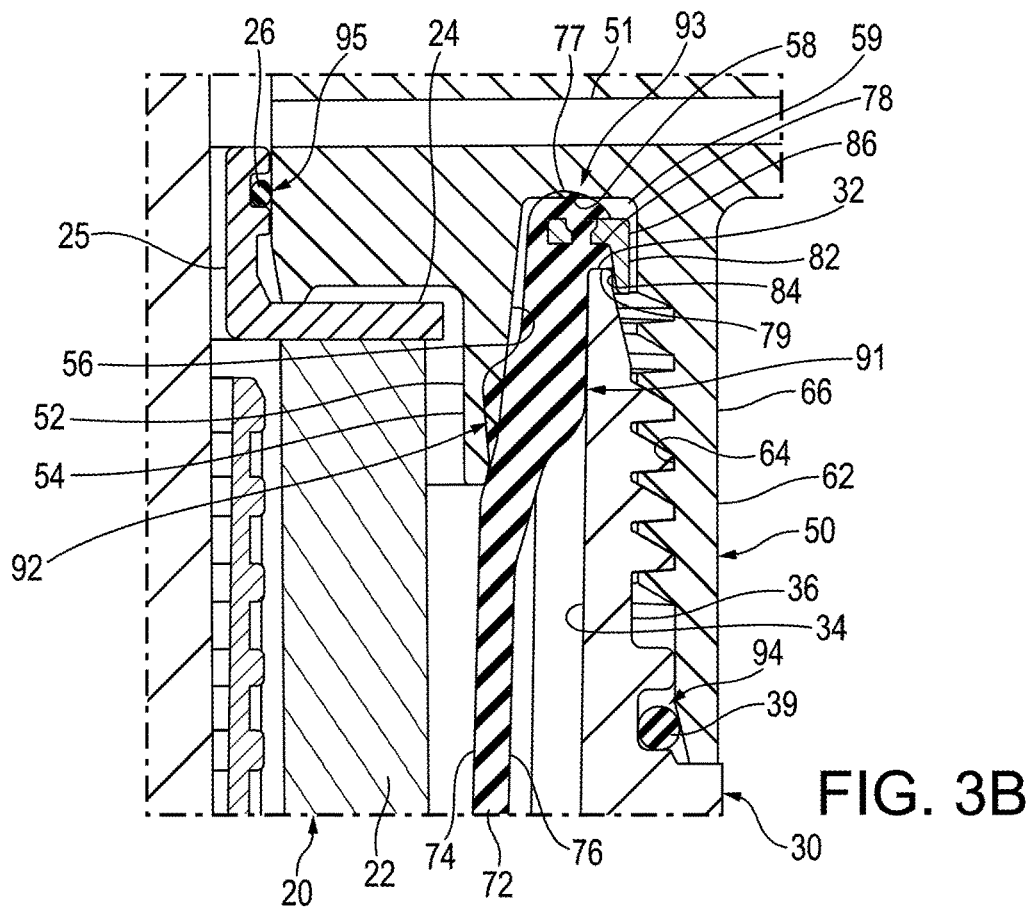
FIG. 3B is an enlarged view of a portion of the filter assembly of FIG. 3A.
Figure 3C:
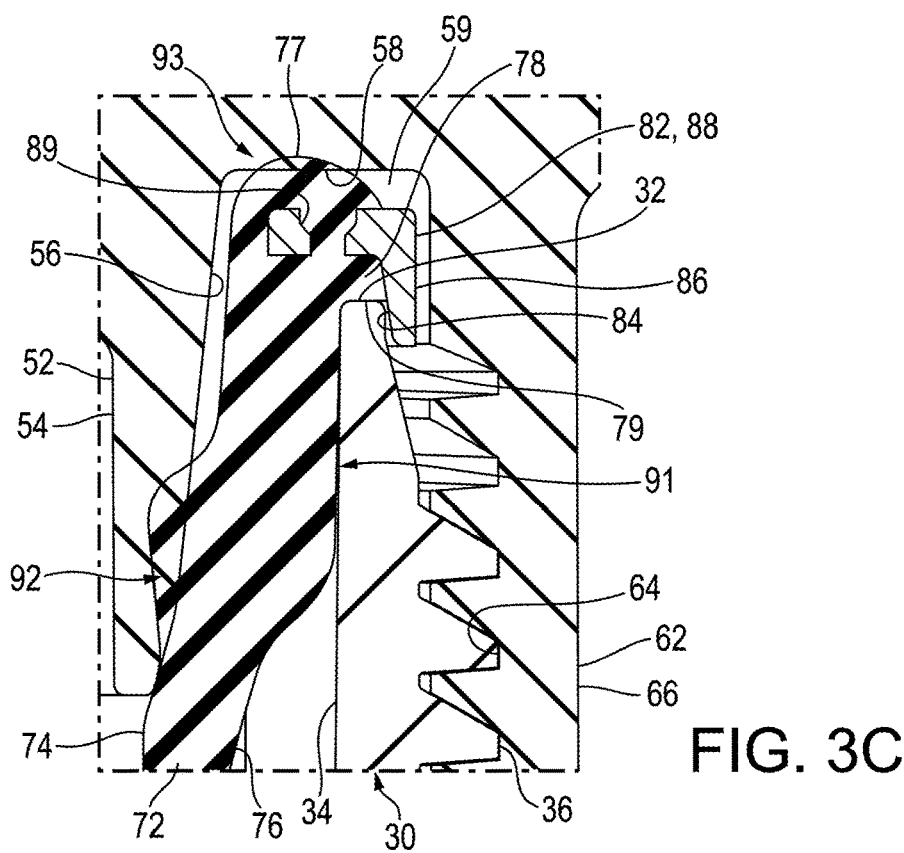
FIG. 3C is an enlarged view of a portion of the filter assembly of FIG. 3A.

In order to account for the volumetric expansion of DEF in freezing temperatures, the membrane assembly 70 is configured to expand in order to allow more room for the DEF within the membrane assembly 70 to expand (at low temperatures), which prevents damage to other structural components within the filter assembly 10. However, the membrane assembly 70 is configured to expand only when frozen or at a particular freezing temperature (e.g., at a temperature of approximately −11° C. or less) and not during normal use when the temperatures are not freezing. For example, the membrane assembly 70 does not expand when the fluid within the filter assembly 10 is simply pressurized during use in warmer temperatures. As shown in FIGS. 3A-3C, the membrane assembly 70 (along with the rest of the filter assembly 10) has a particular configuration in order to ensure that the various parts of the filter assembly 10 form complete and secure seals together, even if the DEF expands and the membrane assembly 70 thereby expands. The membrane assembly 70 may be integrated with certain components within the filter assembly 10, such as the filter element 20.

As shown in FIG. 3A, the membrane assembly 70 fluidly separates and is positionable between the housing 30 and the filter element 20. The filter element 20 is positioned at least partially within the inner region defined by membrane assembly 70 (as described further herein) and may be radially (and optionally axially) spaced apart from the inner surface 74 of the membrane body 72 in order to allow fluid to flow between the filter element 20 and the membrane body 72 (along the axial length of the filter element 20) for filtration. In order to form complete seals with the rest of the filter assembly 10, the membrane assembly 70 extends axially along at least a portion of each of the housing inner surface 34 and the housing outer surface 36 of the housing 30 and radially along at least a portion of the housing top surface 32. The membrane assembly 70 extends along the entire inner, top, and outer circumferences of the housing inner surface 34, the housing top surface 32, and the housing outer surface 36, respectively. As described further herein, the membrane assembly 70 fluidly forms a (bottom and outer) seal with at least the housing inner surface 34 and the housing top surface 32 about the entire circumference of the membrane assembly 70 and the housing 30, thereby creating a sealing region (referred to herein as the "first sealing region 91") between the membrane assembly 70 and the housing inner surface 34 and/or the housing top surface 32 of the housing 30.

A gap or inner area 43 is defined between a portion of the outer surface 76 of the membrane body 72 of the membrane assembly 70 and a portion of the housing inner surface 34. This inner area 43 is delimited by the outer surface 76 of the membrane body 72, the housing inner surface 34, and the first sealing region 91 (where the membrane assembly 70 and the housing 30 form a seal together). The inner area 43 is filled with air (rather than foam) that compresses (and/or is vented out through the air vent 31) in order to provide additional room for the membrane assembly 70 to outwardly expand as the DEF within the inner region of the membrane assembly 70 expands. Accordingly, as the membrane assembly 70 expands, the membrane assembly 70 extends toward the inner area 43 and reduces the volume of the inner area 43.

The membrane assembly 70 comprises the membrane body 72 and a lip 82. As described further herein, the membrane body 72 and the lip 82 may be separate components that are either integrally attached or integrally-formed integral components. As shown in FIG. 3A, the membrane body 72 comprises an axially-extending, circumferential membrane side wall 72a and a radially-extending membrane base or bottom wall 72b. The membrane side wall 72a extends axially from a top surface of the membrane bottom wall 72b and extends around the entire circumference of the membrane bottom wall 72b. The membrane side wall 72a and the membrane bottom wall 72b are constructed as a single, continuous piece. Accordingly, the membrane body 72 comprises a single unitary component that cannot be separated without destruction.

To prevent fluid from flowing through the membrane body 72, the membrane side wall 72a and the membrane bottom wall 72b of the membrane body 72 do not define any through-holes or apertures, thereby fluidly separating the inner region and the outer region of the membrane body 72. The membrane bottom wall 72b is positioned along and completely fluidly closes off a bottom portion of the membrane side wall 72a. The top portion of the membrane side wall 72a defines an opening of the membrane assembly 70 that is configured to receive the filter element 20.

The membrane side wall 72a of the membrane body 72 completely radially surrounds at least a portion of the axial length of the filter element 20. In particular, the membrane side wall 72a of the membrane body 72 extends axially along at least a portion of or the entire axial length of the side walls of the filter element 20 (i.e., along the filter media 22 and optionally at least a portion of the top endplate 24). The membrane bottom wall 72b of the membrane body 72 extends axially along and completely surrounds one side of the bottom of the filter element 20 (i.e., the bottom endplate 28). At least a portion of the (or the entire) axial length of the membrane body 72 is radially surrounded by the housing side wall 33 of the housing 30. The membrane bottom wall 72b of the membrane body 72 extends along and is surrounded axially on one side by the base 35 of the housing 30. Accordingly, the membrane body 72 is positionable (both radially and axially) between the housing inner surface 34 and the filter element 20.

As shown in FIG. 3A, the membrane body 72 comprises an inner surface 74 (which faces radially inward, toward the filter element 20 and the outer surface 56 of the inner extension 52 of the filter head 50) and an outer surface 76 (which faces radially outward, directly toward the housing inner surface 34 when assembled) that are opposite each other. The inner surface 74 of the membrane body 72 of the membrane assembly 70 (in particular the membrane side wall 72a and the membrane bottom wall 72b together) forms and defines an inner region of the membrane assembly 70 for receiving the filter element 20. In particular, the inner region of the membrane assembly 70 is surrounded and defined by the membrane side wall 72a and the membrane bottom wall 72b of the membrane body 72. The filter element 20 is at least partially positioned within the inner region of the membrane assembly 70.

As shown in FIG. 3C, the membrane body 72 also comprises an extension 78 extending substantially horizontally (i.e., radially outwardly) from the top portion of the outer surface 76 of the membrane side wall 72a (and is approximately perpendicular to the outer surface 76 of the membrane side wall 72a of the membrane body 72 and the inner surface 84 of the lip 82). The extension 78 is sized and positioned to extend radially over and along and directly abut the housing top surface 32 when assembled, axially surrounding the housing top surface 32. Accordingly, the extension 78 is positioned axially between the housing top surface 32 and the slot surface 58 of the filter head 50. The extension 78 radially spaces out the lip 82 from the outer surface 76 of the membrane body 72 in order to provide an area to receive the top portion (including the housing top surface 32) of the housing 30. The extension 78 comprises a top surface 77 (which faces axially upward, away from the filter housing 30), and a bottom surface 79 (which faces axially downward, directly toward the housing top surface 32 when assembled) that are opposite each other. The top surface 77 extends along both the extension 78 and the top of the membrane side wall 72a of the membrane body 72. The extension 78 extends about the entire circumference of the membrane side wall 72a of the membrane body 72.

The lip 82 extends vertically (i.e., axially) downwardly toward the membrane bottom wall 72b from the extension 78 of the membrane body 72 (i.e., in the same direction as (relative to the extension 78) and substantially parallel to the membrane side wall 72a of the membrane body 72) to secure the membrane assembly 70 to the housing outer surface 36. The lip 82 is radially spaced apart from and positioned radially outward relative to the membrane side wall 72a and the extension 78 of the membrane body 72. The lip 82 extends about the entire circumference of the membrane body 72.

When assembled with the housing 30, the lip 82 radially surrounds the top portion of the housing side wall 33 of the housing 30. The lip 82 extends axially along at least a portion of the housing outer surface 36 (while the membrane side wall 72a of the membrane body 72 extends axially along the housing inner surface 34 and the extension 78 of the membrane body 72 extends radially along the housing top surface 32) and prevents the membrane assembly 70 from being pulled axially downward (inwardly further into the housing 30) due to the DEF expansion forces. The lip 82 comprises an inner surface 84 (which faces radially inward, toward the housing outer surface 36 and the membrane side wall 72a) and an outer surface 86 (which faces radially outward, directly toward the inner surface 64 of the outer extension 62 of the filter head 50 when assembled) that are opposite each other.

According to various embodiments (as shown in FIGS. 5A, 6A, 8A, and 8E), the membrane assembly 70, and in particular the membrane body 72, may include a plurality of ribs 71 along the outer surface 76 of the membrane body 72 in order to provide structural support, in particular in suction applications. The ribs 71 extend axially along the entire axial height of the membrane side wall 72a of the membrane body 72 and radially along the bottom surface of the membrane bottom wall 72b of the membrane body 72, in particular along the outer surface 76 of the membrane body 72. The ribs 71 are spaced apart from each other about the circumference of the membrane side wall 72a.

Sealing Regions

Due to the configuration and positioning of the various elements of the filter assembly 10 (in particular the membrane assembly 70 and the filter head 50), the filter assembly 10 comprises and forms multiple sealing regions (including the fourth sealing region 94 and the fifth sealing region 95, as described further herein). For example, the membrane assembly 70 forms a seal with the housing 30 at the first sealing region 91. In particular, as shown in FIGS. 3A-3C, the outer surface 76 of the membrane side wall 72a of the membrane body 72 forms a seal (that includes an outer seal and a bottom seal) with the housing 30 at the first sealing region 91. The first sealing region 91 may extend along different areas of the membrane body 72 (i.e., along the outer surface 76 of the membrane side wall 72a and/or the bottom surface 79 of the extension 78) and the housing 30 (i.e., along the housing inner surface 34 of the housing side wall 33 and/or the housing top surface 32). For example, the outer surface 76 of the membrane side wall 72a of the membrane body 72 may form a (outer) seal to the top portion of the housing inner surface 34, and the bottom surface 79 of the extension 78 of the membrane body 72 form a (bottom) seal with the housing top surface 32, both of which provide portions of the first sealing region 91. The first sealing region 91 extends continuously and uninterrupted along and between the top portion of outer surface 76 of the membrane side wall 72a of the membrane body 72 and the bottom surface 79 of the extension 78 of the membrane body 72 (and therefore also along and between the top portion of the housing side wall 33 of the housing inner surface 34 and the housing top surface 32).

The membrane assembly 70 forms a seal with the inner extension 52 of the filter head 50 at the second sealing region 92. In particular, as shown in FIGS. 3A-3C, the inner surface 74 of the membrane side wall 72a of the membrane body 72 of the membrane assembly 70 forms a (inner) seal with the outer surface 56 of the inner extension 52 of the filter head 50. At least a portion of the second sealing region 92 is directly opposite a portion of the first sealing region 91 (in particular the portion of the first sealing region 91 along the outer surface 76 of the membrane side wall 72a of the membrane body 72 and the housing inner surface 34) through the membrane body 72. Accordingly, the inner seal (of the second sealing region 92) and the outer seal (of the first sealing region 91) are directly opposite each other through the membrane side wall 72a of the membrane body 72. The inner extension 52 of the filter head 50 presses against the inner surface 74 of the membrane body 72 (which presses the outer surface 76 of the membrane body 72 and the housing 30 closer), thereby forming a seal among the filter head 50, the membrane assembly 70, and the housing 30 (and improving both the first sealing region 91 and the second sealing region 92). At least a portion of the first sealing region 91 and the second sealing region 92 together form a primary sealing region that prevents DEF leakage, even when the DEF is expanded in low temperature conditions.

The membrane assembly 70 forms a seal with the slot surface 58 of the filter head 50 at the third sealing region 93. In particular, the top surface 77 of the membrane body 72 forms a (top) seal with the slot surface 58 of the filter head 50 (extending radially directly between the inner extension 52 and the outer extension 62 of the filter head 50). At least a portion of the third sealing region 93 is directly opposite a portion of the first sealing region 91 (in particular the portion of the first sealing region 91 along the bottom surface 79 of the extension 78 and the housing top surface 32) through the extension 78 of the membrane body 72. Accordingly, the formed top seal (of the third sealing region 93) and the formed bottom seal (of the first sealing region 91) are directly opposite each other through the extension 78. As the filter head 50 is threaded onto the housing 30, the slot surface 58 presses axially downward against the top surface 77 of the extension 78 of the membrane body 72 (which presses the extension 78 of the membrane body 72 and the housing top surface 32 closer), thereby further forming seals among the filter head 50, the membrane assembly 70, and the housing 30 together (and improving the first sealing region 91 and the third sealing region 93). At least a portion of the first sealing region 91 and the third sealing region 93 together form a secondary sealing region that also prevents DEF leakage, in addition to the primary sealing region.

Housing Notches and Membrane Assembly Projections

Figure 4:
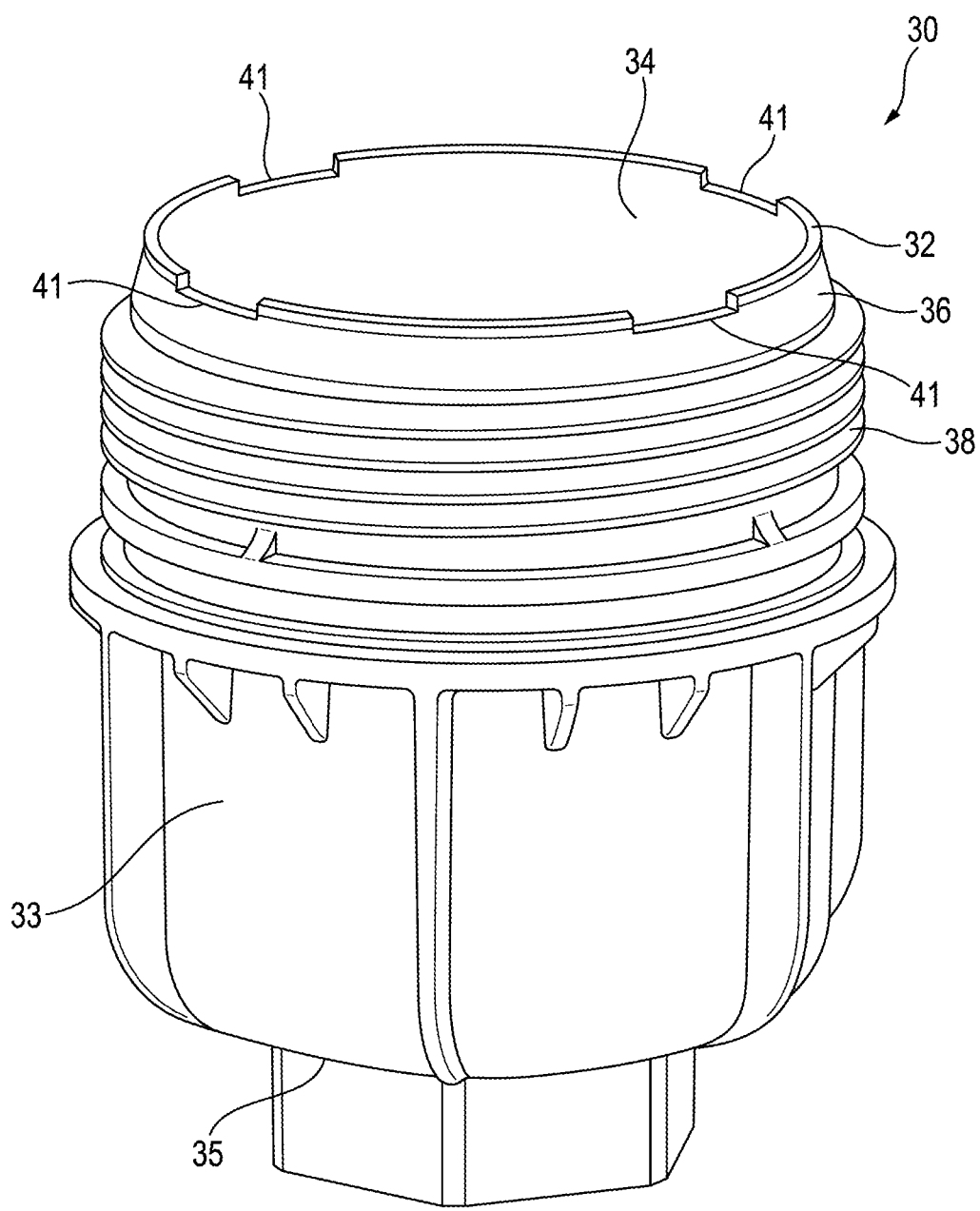
FIG. 4 is a perspective view of a housing of the filter assembly of FIG. 3A.
Figure 5B:
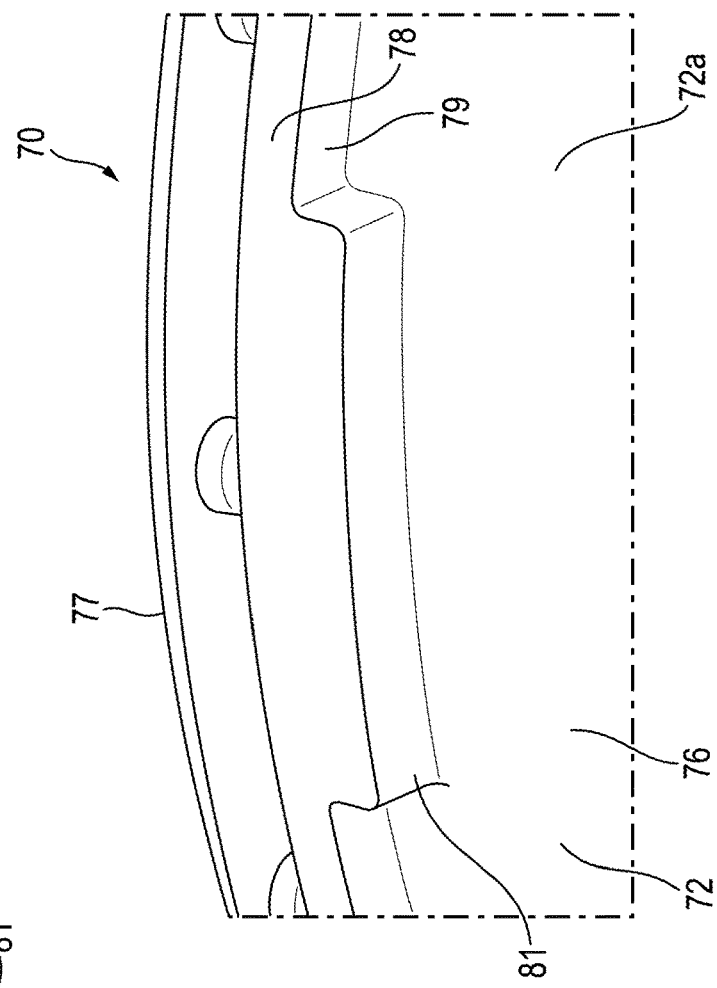
FIG. 5B is an enlarged view of a portion of the membrane assembly of FIG. 5A.
Figure 5A:
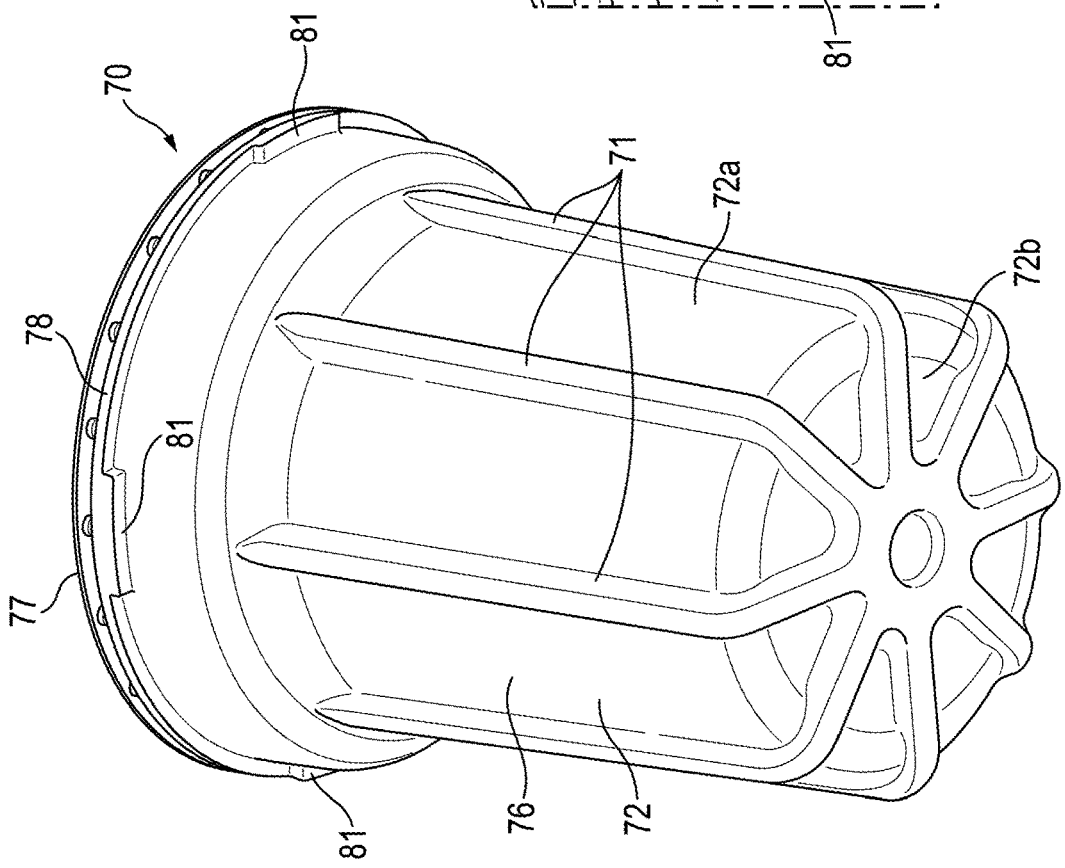
FIG. 5A is a perspective view of a portion of a membrane assembly of the filter assembly of FIG. 3A.

As shown in FIGS. 4-5B, at least one of the extension 78 of the membrane body 72 and the housing top surface 32 comprises at least one projection 81, and the other of the extension 78 of the membrane body 72 and the housing top surface 32 defines at least one notch 41 that is complementary to the at least one projection 81. For example, the housing top surface 32 defines at least one groove or notch 41 (and preferably a plurality of notches 41 along its circumference), and the bottom surface 79 of the extension 78 of the membrane assembly 70 comprises at least one projection 81 (and preferably a plurality of projections 81 along its circumference). The notch 41 and the projection 81 are complementary to each other (in size, position, number, and shape), such that the projection 81 fits securely into and within the notch 41 when the membrane assembly 70 is positioned at least partially within the housing 30, thereby locking (in particular rotatably locking) the housing 30 and the membrane assembly 70 together. For example, the notches 41 and the projections 81 interlock together to prevent the housing 30 and the membrane assembly 70 from rotating relative to each other once assembled.

The notches 41 of the housing 30 are positioned along the housing top surface 32 and extend axially vertically downward, toward the base 35 of the housing 30. The projections 81 of the membrane assembly 70 are positioned along the outer surface 76 of the membrane side wall 72a of the membrane body 72 and also extend axially vertically downward in order to interlock with the notches 41 upon assembly. As shown in FIG. 5B, the projections 81 may be positioned along and extend axially downwardly from the bottom surface 79 of the extension 78 of the membrane body 72 (between the outer surface 76 of the membrane body 72 and the inner surface 84 of the lip 82 (not shown in FIGS. 5A-5B)).

Membrane Body and Lip

According to one embodiment as shown in FIGS. 3A-3C and 6A-7B, the membrane assembly 70 is constructed as two separate pieces (forming the membrane body 72 and the lip 82) that are integrated together. Once the membrane body 72 and the lip 82 are formed together, they create a single unitary component that cannot be separated without destruction. Accordingly, the membrane body 72 and the lip 82 may optionally be two different materials. For example, the membrane body 72 may be a flexible rubber, and the lip 82 may be a rigid plastic or metal.

Figure 7B:
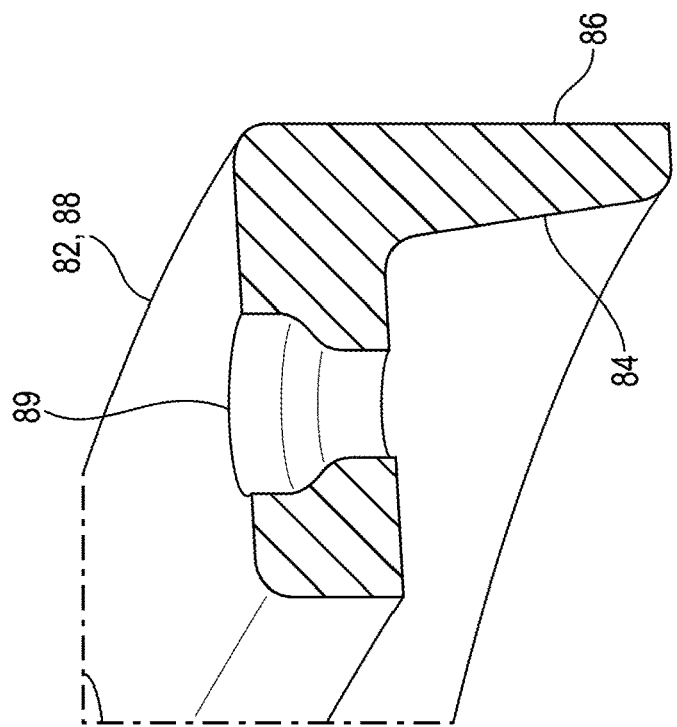
FIG. 7B is a cross-sectional view of the ring of the membrane assembly of the filter assembly of FIG. 3A.
Figure 7A:
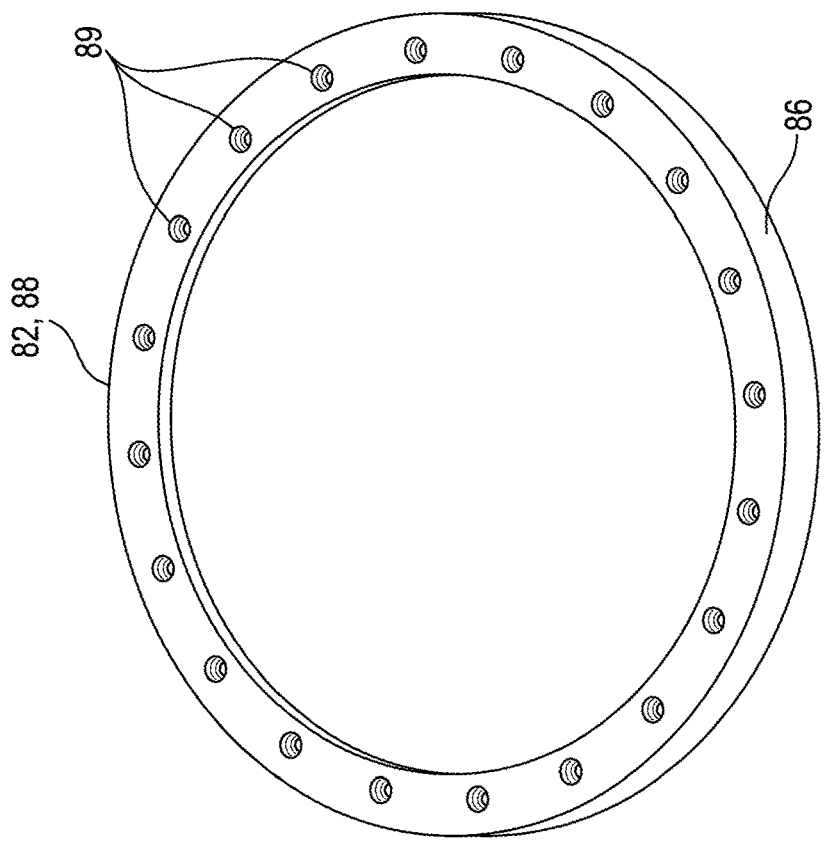
FIG. 7A is a perspective view of a ring of the membrane assembly of the filter assembly of FIG. 3A.

The lip 82 may comprise a ring 88, a portion of which is over-molded into the membrane body 72. As shown in FIG. 3C (in view of FIG. 7B), the ring 88 comprises a horizontal, radially-extending portion (that is over-molded into the extension 78 of the membrane body 72) and a vertical, axially-extending portion (extending out from the membrane body 72, along the housing outer surface 36). As shown in FIGS. 7A-7B, the ring 88 may include a plurality of through-holes or apertures 89 extending completely through the radially-extending portion of the ring 88 and are positioned and spaced apart from each other regularly about the circumference of the ring 88. The apertures 89 allow a portion of the membrane body 72 to be overmolded into and through the ring 88 for a secure attachment between the ring 88 and the membrane body 72 (as shown in FIG. 3C).

Figure 8D:
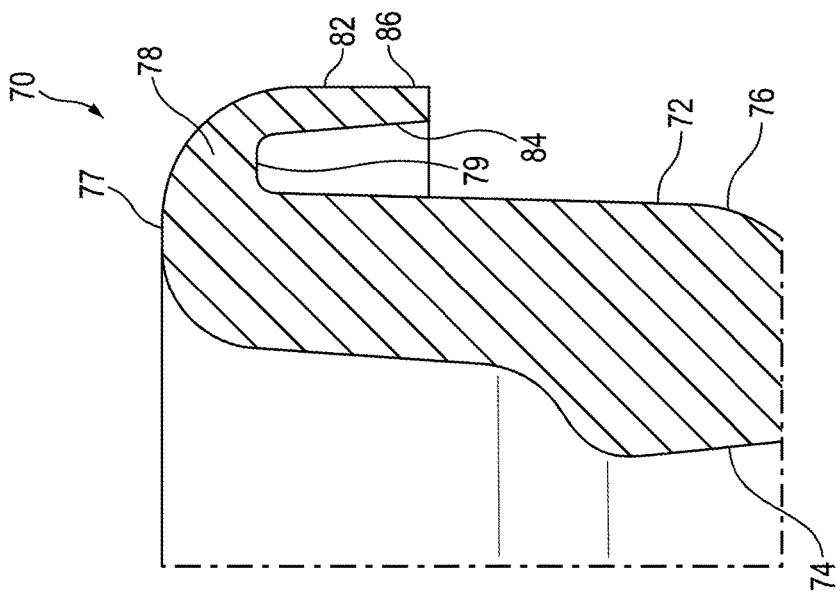
FIG. 8D is a cross-sectional view of a portion of the membrane assembly of FIG. 8A.
Figure 8C:
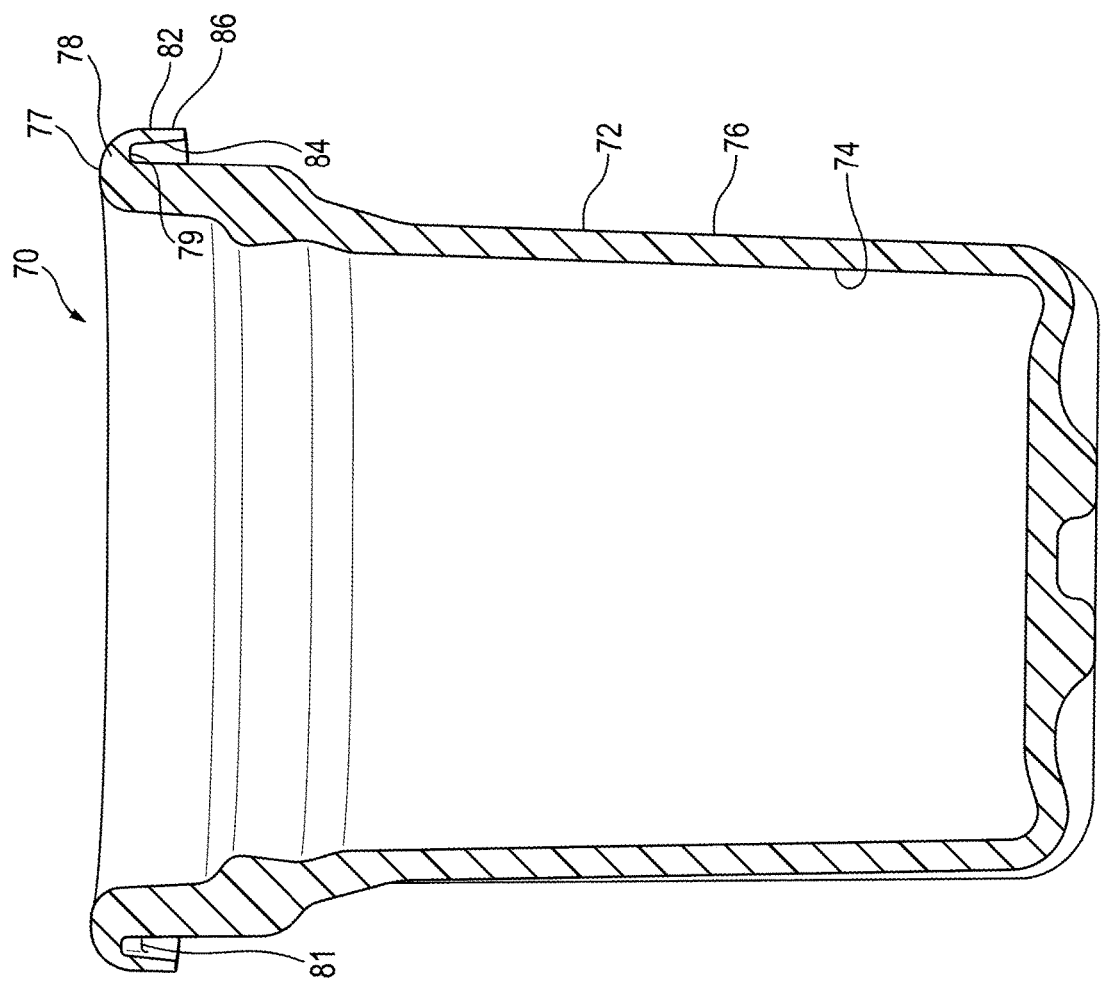
FIG. 8C is a cross-sectional view of the membrane assembly of FIG. 8A.
Figure 8F:
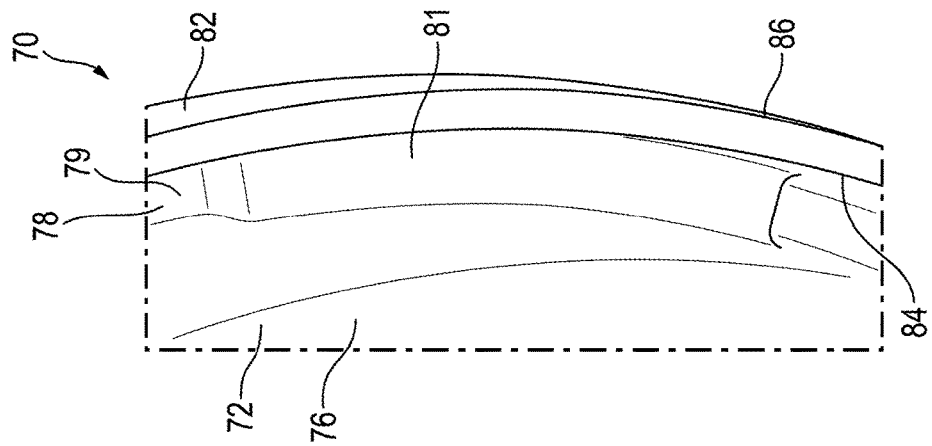
FIG. 8F is an enlarged view of a portion of the membrane assembly of FIG. 8A.
Figure 8E:
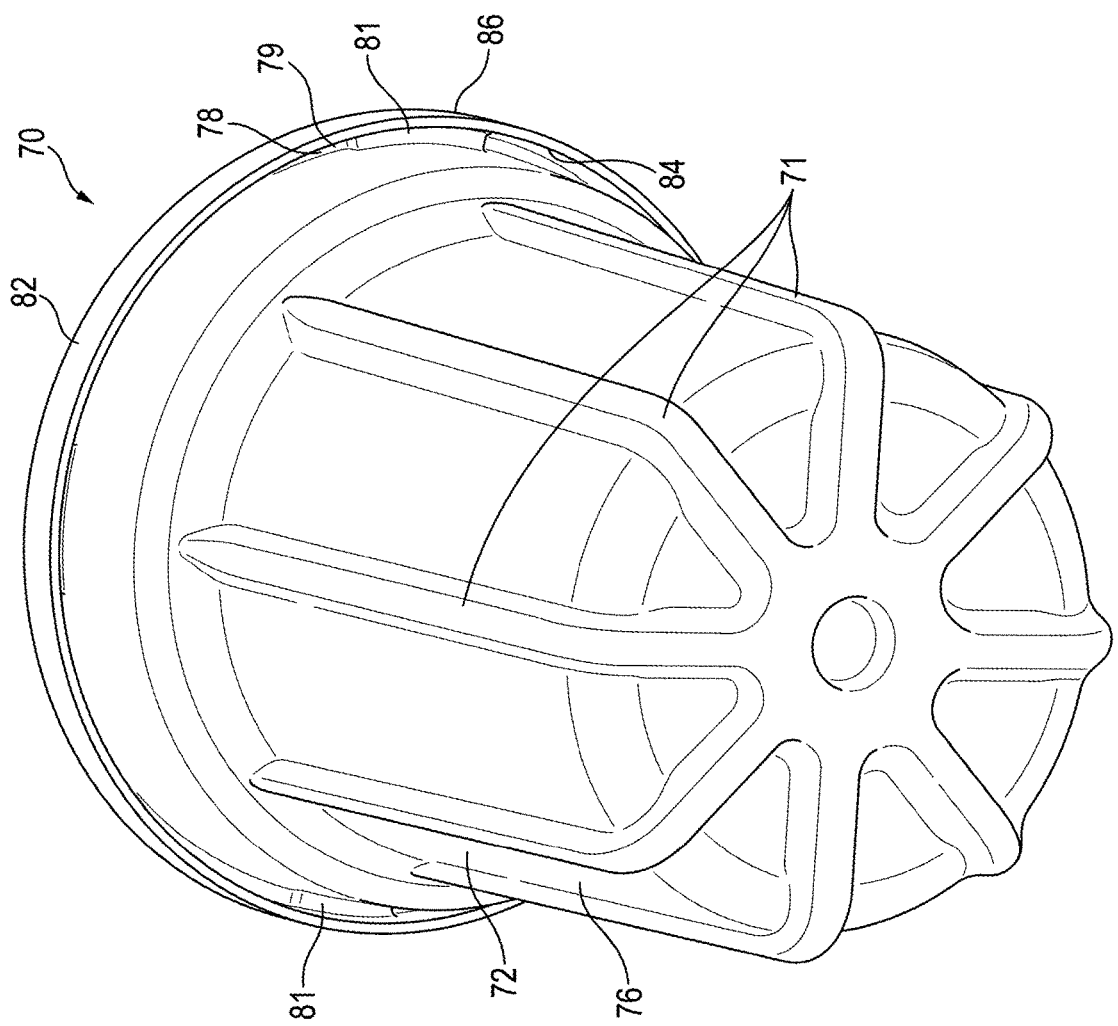
FIG. 8E is a perspective view of the membrane assembly of FIG. 8A.

As shown in FIGS. 8A-8E, the membrane assembly 70 (including both the membrane body 72 and the lip 82) may be constructed as a single piece. Accordingly, the membrane assembly 70 comprises (and is initially constructed as) a single unitary component that cannot be separated without destruction. For example, the membrane assembly 70 may be constructed as a single plastic molded part. Accordingly, the membrane body 72 and the lip 82 may be the same material as each other and are molded together at the same time. As shown in FIGS. 8E-8F, the membrane assembly 70 may still comprises at least one projection 81 extending downwardly from the bottom surface 79 of the extension 78 (between the outer surface 76 of the membrane body 72 and the inner surface 84 of the lip 82).

The various embodiments disclosed herein may have any features, configurations, and components of the other embodiments disclosed herein, except where noted otherwise.

Calculations and Experimental Results

In order to calculate the pressure within the filter assembly 10, the ideal gas equation (PV=nRT) is used, where P is the pressure, V is the volume, n is number of moles of gas (in this case, 1 mole), R is the ideal gas constant, and T is the temperature. At the initial condition, the equation is modeled as $P_1V_1=\rho_1RT_1$ (which may be when $T_1$ is $-10°$ C., which is equal to 263.15 K and $P_1$ is atmospheric pressure, which is 1 bar). When the DEF is frozen, the equation is modeled as $P_2V_2=\rho_2RT_2$ (which may be when $T_2$ is $-25°$ C., which is equal to 248.15 K). Combining the two equations results in the following equation: $P_2/P_1=(V_1/V_2)*(T_2/T_1)$.

Assuming that the volume of DEF is 100 milliliters (mL), that $V_1$ (the volume of air) is 40% of the volume of DEF (i.e., 40 mL), that $T_1$ is 295.15 K, and that $T_2$ is 233.25 K, the volume of air is reduced to 32 mL (i.e., $V_2$) when the DEF is frozen, due to 8% compression caused by the expansion of DEF. In this scenario, $P_2$ is equal to $(40/32)*(248.15/263.15)$, which is 1.2 bar.

Figure 9A:
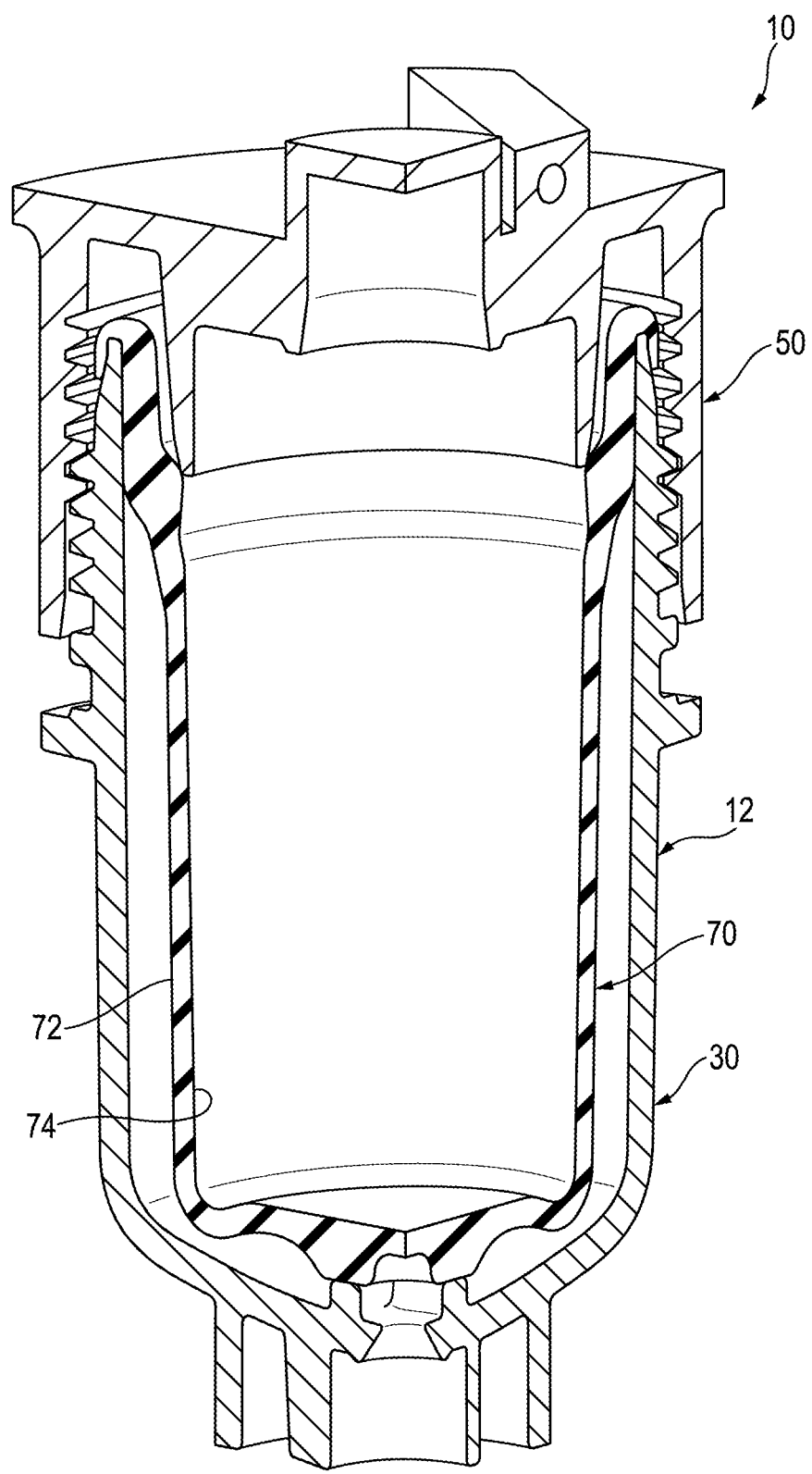
FIG. 9A is a set-up for an experimental simulation of a filter assembly according to one embodiment.
Figures 9B, 9C:
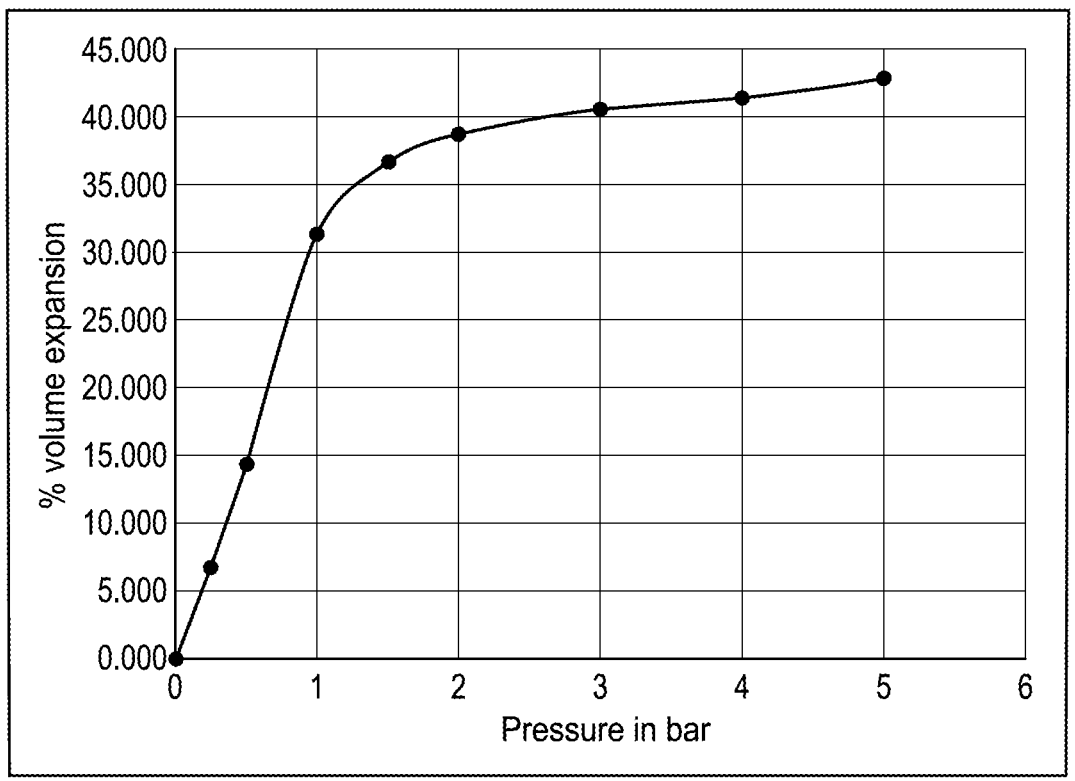
FIG. 9B is a chart of experimental results of the setup of FIG. 9A.
FIG. 9C is a graph of experimental results of the setup of FIG. 9A showing the percentage of volume expansion as a function of the pressure.

The deformation of the membrane assembly 70, in particular the percentage of volume expansion, due to an increase of pressure (induced by a low temperature) was simulated and tested. The setup is shown in FIG. 9A, and the results are shown in FIGS. 9B-9C. In this test, the temperature was approximately $-40°$ C., assuming the maximum pressure will be generated during DEF expansion. Since the membrane assembly 70 has ribs 71, a 2D axisymmetric analysis on the deformed shape of the membrane assembly 70 was performed for two different sections (i.e., through the ribs 71 and without the ribs 71), and the expanded volume of the membrane assembly 70 was subsequently calculated for both sections based on their angles (i.e., the width). Due to the symmetry of the membrane assembly 70, a quarter section of the filter assembly 10 was considered (as shown in FIG. 9A) with symmetric boundary conditions along the height of the filter assembly 10 (i.e., the "cut" faces of the filter assembly 10). In the simulation, the filter head 50 was vertically displaced downward to compress the membrane assembly 70, and pressure was applied (in an outward direction) on the internal surfaces of the membrane assembly 70 (in particular along the inner surface 74 of the membrane body 72).

As shown in the results in FIGS. 9B-9C, by expanding, the membrane assembly 70 can accommodate the expansion of the DEF at low temperature. For example, at a very low pressure (i.e., 0.5 bar), the membrane assembly 70 can deform more than 10% to provide a larger volume for the expanded DEF.

Figure 10A:
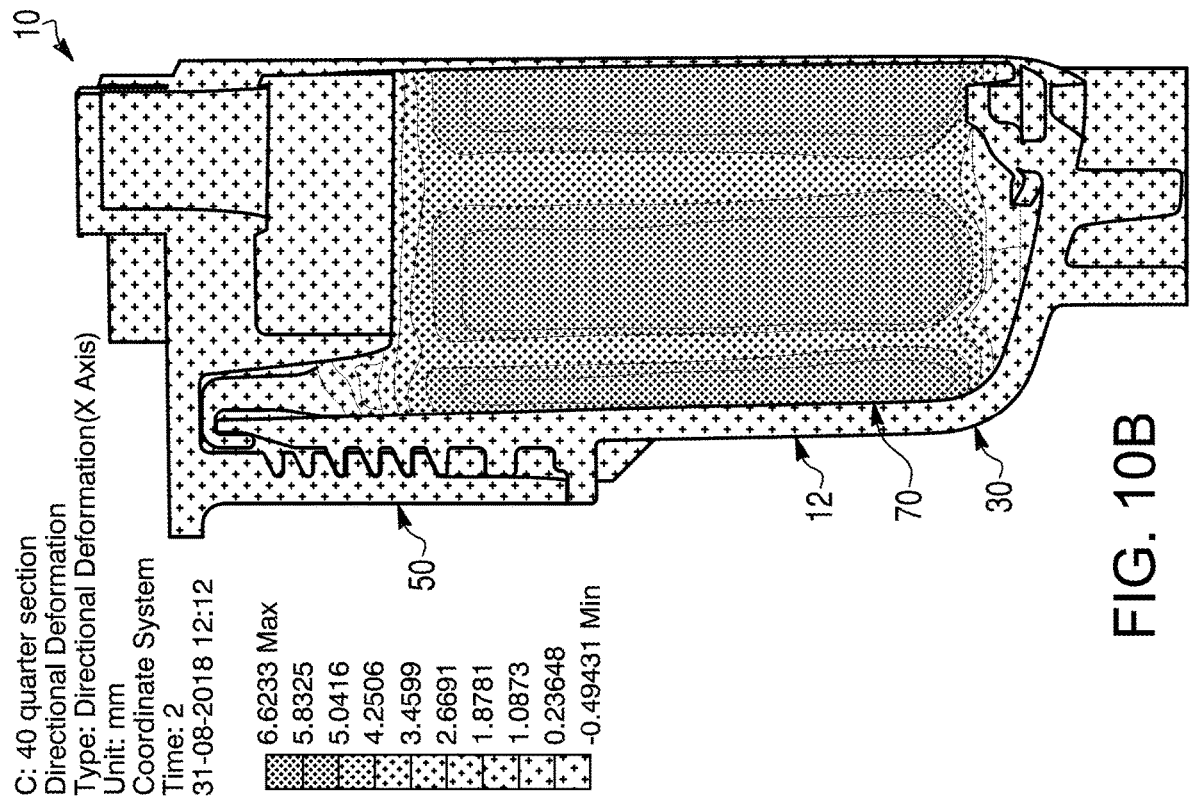
FIG. 10A is a cross-sectional view of a filter assembly under a finite element analysis after 2 bars of pressure.
Figure 10B:
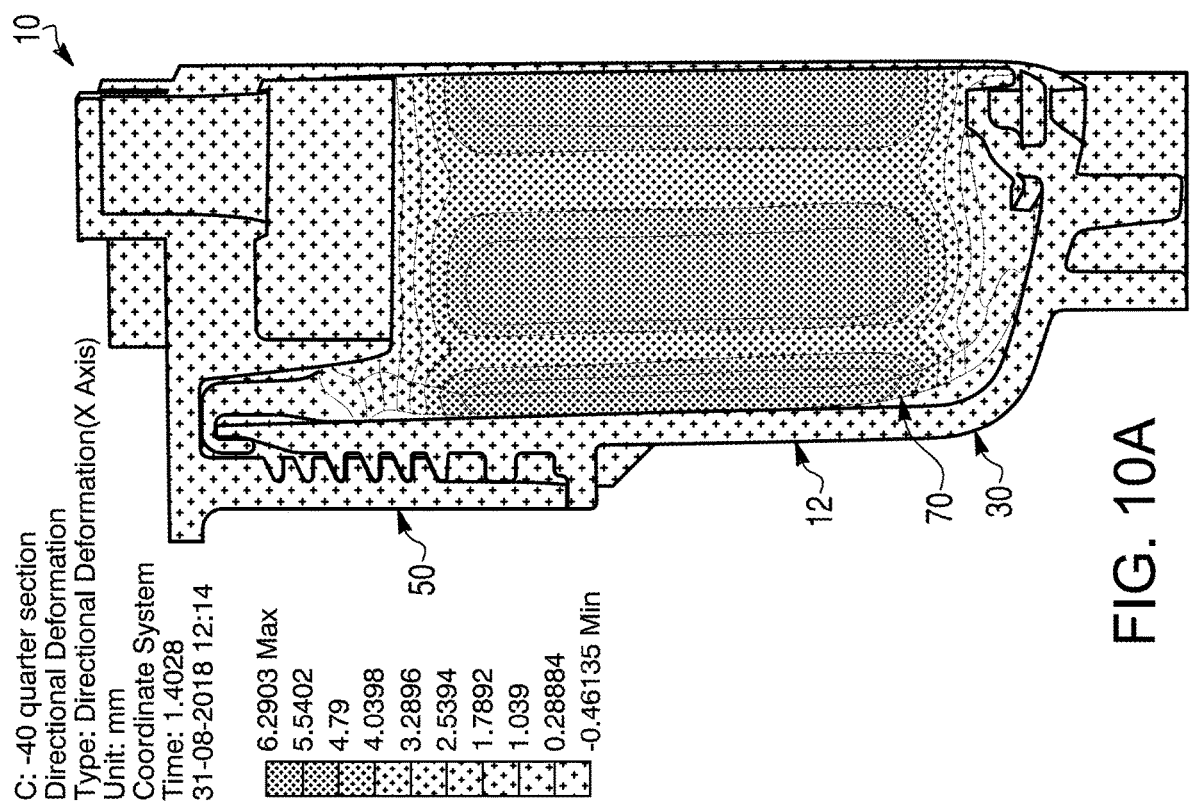
FIG. 10B is a cross-sectional view of the filter assembly under a finite element analysis after 5 bars of pressure.

FIGS. 10A-10B show a finite element analysis (FEA) of the membrane assembly 70 during deformation. In particular, FIG. 10A shows the directional deformation of the membrane assembly 70 after 2 bars of pressure, and FIG. 10B shows the directional deformation of the membrane assembly 70 after 5 bars of pressure.

As utilized herein, the term "approximately" and similar terms are intended to have a broad meaning in harmony with the common and accepted usage by those of ordinary skill in the art to which the subject matter of this disclosure pertains. The term "approximately" as used herein refers to ±5% of the referenced measurement, position, or dimension. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," "attached," and the like as used herein mean the joining of two members directly to one another. Such joining may be stationary (e.g., permanent) or moveable (e.g., removable or releasable).

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter assembly comprising:
   a housing comprising a housing inner surface, a housing outwardly facing peripheral surface substantially radially opposite the housing inner surface, and a housing top surface extending between the housing inner surface and the housing outwardly facing peripheral surface, the housing outwardly facing peripheral surface being an outermost exterior surface of the housing;
   a filter element for filtering a fluid and positioned within the housing; and
   an expansion membrane assembly that fluidly separates and is positioned between the housing and the filter element, the expansion membrane assembly extending along the housing inner surface, the housing top surface, and the housing outwardly facing peripheral surface of the housing, the expansion membrane assembly outwardly expandable within the housing towards the housing inner surface and a gap is defined between a portion of an outer surface of the expansion membrane assembly and a portion of the housing inner surface with the filter element radially spaced apart from an inner surface of the expansion membrane assembly.

2. The filter assembly of claim 1, wherein the expansion membrane assembly forms a seal with the housing inner surface and the housing top surface.

3. The filter assembly of claim 1, wherein the expansion membrane assembly comprises a membrane body and a lip, the membrane body positioned between the housing inner surface and the filter element and the lip extending along the housing outwardly facing peripheral surface.

4. The filter assembly of claim 3, wherein the membrane body comprises a membrane side wall and a membrane bottom wall that together define an inner area of the membrane body for receiving the filter element, the membrane body comprising an extension extending radially outwardly from a top portion of the membrane side wall.

5. The filter assembly of claim 4, wherein the extension of the membrane body extends along and directly abuts the housing top surface.

6. The filter assembly of claim 4, wherein the lip is positioned radially outwardly relative to the membrane side wall and extends axially downwardly toward the membrane bottom wall from the extension.

7. A filter assembly comprising:
   a housing;
   a filter element for filtering a fluid and positioned within the housing; and
   an expansion membrane assembly that fluidly separates and is positioned between the housing and the filter element, the expansion membrane assembly extending along a housing inner surface, a housing top surface, and a housing outer surface of the housing,
   the expansion membrane assembly comprising a membrane body and a lip, the membrane body positioned between the housing inner surface and the filter element and the lip extending along the housing outer surface,
   the membrane body comprising a membrane side wall and a membrane bottom wall that together define an inner area of the membrane body for receiving the filter element, the membrane body comprising an extension extending radially outwardly from a top portion of the membrane side wall,
   wherein one of the extension of the membrane body and the housing top surface comprises at least one projection, and the other of the extension of the membrane body and the housing top surface defines at least one notch that is complementary to the at least one projection,
   wherein the at least one projection fits within the at least one notch such that the expansion membrane assembly and the housing are rotationally locked together.

8. A filter assembly comprising:
   a housing;
   a filter element for filtering a fluid and positioned within the housing;
   an expansion membrane assembly that fluidly separates and is positioned between the housing and the filter element, the expansion membrane assembly extending along a housing inner surface, a housing top surface, and a housing outer surface of the housing, the expansion membrane assembly outwardly expandable within the housing towards the housing inner surface, wherein and a gap is defined between a portion of an outer surface of the expansion membrane assembly and a portion of the housing inner surface, the expansion membrane assembly comprising a membrane body and a lip, the membrane body positioned between the housing inner surface and the filter element and the lip extending along the housing outer surface; and
   a filter head, the filter head forming an inner seal with and extending along an inner surface of the membrane body and extending along the housing outer surface.

9. The filter assembly of claim 8, wherein the filter head extends along an outer surface of the lip of the expansion membrane assembly.

10. The filter assembly of claim 8, wherein the filter head comprises an inner extension forming the inner seal with the inner surface of the membrane body and an outer extension extending along the housing outer surface,
   wherein the inner extension and the outer extension of the filter head define a slot, wherein at least a portion of the expansion membrane assembly and at least a portion of the housing are positioned within the slot.

11. The filter assembly of claim 10, wherein the membrane body comprises an extension positioned axially between the housing top surface and a slot surface of the filter head, the slot surface positioned radially between the inner extension and the outer extension of the filter head.

12. The filter assembly of claim 11, wherein the extension comprises a top surface and a bottom surface that are opposite each other,
wherein the top surface of the extension forms a top seal with the slot surface of the filter head, and the bottom surface of the extension forms a bottom seal with the housing top surface such that the top seal and the bottom seal are directly opposite each other through the extension.

13. The filter assembly of claim 10, wherein an outer surface of the membrane body forms an outer seal with the housing inner surface, wherein the inner seal and the outer seal are directly opposite each other through the membrane body.

14. A filter assembly comprising:
a housing;
a filter element for filtering a fluid and positioned within the housing; and
an expansion membrane assembly that fluidly separates and is positioned between the housing and the filter element, the expansion membrane assembly extending along a housing inner surface, a housing top surface, and a housing outer surface of the housing,
the expansion membrane assembly comprising a membrane body and a lip, the membrane body positioned between the housing inner surface and the filter element and the lip extending along the housing outer surface,
wherein the membrane body comprises a membrane side wall, a membrane bottom wall, and a plurality of ribs along an outer surface of the membrane body, the plurality of ribs extending axially along the membrane side wall and radially along the membrane bottom wall.

15. A method of assembling a filter assembly comprising:
positioning an expansion membrane assembly at least partially in a housing such that the expansion membrane assembly extends along a housing inner surface, a housing top surface, and a housing outwardly facing peripheral surface of the housing, the housing outwardly facing peripheral surface being an outermost exterior surface of the housing and being substantially opposite the housing inner surface, the expansion membrane assembly outwardly expandable within the housing towards the housing inner surface and a gap is defined between a portion of an outer surface of the expansion membrane assembly and a portion of the housing inner surface; and
positioning a filter element for filtering a fluid at least partially within the expansion membrane assembly and at least partially within the housing such that the expansion membrane assembly fluidly separates and is positioned between the housing and the filter element, wherein the gap is defined between a portion of an outer surface of the expansion membrane assembly and a portion of the housing inner surface with the filter element radially spaced apart from an inner surface of the expansion membrane assembly.

16. The method of claim 15, wherein positioning the expansion membrane assembly at least partially within the housing causes at least one of an outer seal or a bottom seal to be formed between the expansion membrane assembly and at least one of the housing inner surface and the housing top surface, respectively.

17. The method of claim 15, wherein positioning the expansion membrane assembly at least partially within the housing causes a lip of the expansion membrane assembly to extend along the housing outwardly facing peripheral surface, and
wherein positioning the filter element at least partially within the expansion membrane assembly and at least partially within the housing positions a membrane body of the expansion membrane assembly between the housing inner surface and the filter element.

18. The method of claim 17, wherein positioning the expansion membrane assembly at least partially within the housing causes a bottom seal to be formed between a bottom surface of an extension of the membrane body and the housing top surface.

19. A method of assembling a filter assembly comprising:
positioning an expansion membrane assembly at least partially in a housing such that the expansion membrane assembly extends along a housing inner surface, a housing top surface, and a housing outer surface of the housing, the expansion membrane assembly outwardly expandable within the housing towards the housing inner surface and a gap is defined between a portion of an outer surface of the expansion membrane assembly and a portion of the housing inner surface;
positioning a filter element for filtering a fluid at least partially within the expansion membrane assembly and at least partially within the housing such that the expansion membrane assembly fluidly separates and is positioned between the housing and the filter element, wherein the gap is defined between a portion of an outer surface of the expansion membrane assembly and a portion of the housing inner surface with the filter element radially spaced apart from an inner surface of the expansion membrane assembly, wherein
positioning the expansion membrane assembly at least partially within the housing causes a lip of the expansion membrane assembly to extend along the housing outer surface,
positioning the filter element at least partially within the expansion membrane assembly and at least partially within the housing positions a membrane body of the expansion membrane assembly between the housing inner surface and the filter element, and
positioning the expansion membrane assembly at least partially within the housing causes a bottom seal to be formed between a bottom surface of an extension of the membrane body and the housing top surface; and
attaching the housing to a filter head such that the filter head extends along the housing outer surface and along an inner surface of the membrane body, thereby causing an inner seal to be formed between the filter head and the inner surface of the membrane body.

20. The method of claim 19, wherein attaching the housing to the filter head causes a top seal to be formed between a top surface of the extension of the membrane body and a slot surface of the filter head such that the top seal and the bottom seal are opposite each other through the extension.

21. A filter sub-assembly comprising:
a filter element for filtering a fluid; and
an expansion membrane assembly surrounding the filter element, the expansion membrane assembly comprising a membrane body and a lip, the membrane body positioned around an outer surface of the filter element and the lip extending away from the membrane body, the membrane body comprising a membrane side wall and a membrane bottom wall that together define an inner area of the membrane body for receiving the filter element, the membrane body comprising an extension extending radially outwardly from a top portion of the membrane side wall, the lip extending axially from a bottom surface of the extension toward the membrane bottom wall and positioned radially outward relative to the extension, wherein the extension of the membrane body comprises at least one projection or at least one notch that extends in an axial direction to allow for rotational locking.

22. A filter sub-assembly comprising:

a filter element for filtering a fluid; and an expansion membrane assembly surrounding the filter element, the expansion membrane assembly comprising a membrane body and a lip, the membrane body positioned around an outer surface of the filter element and the lip extending away from the membrane body and radially spaced out from an outer surface of the membrane body to form a gap between the lip and the membrane body, the membrane body comprising a membrane side wall, a membrane bottom wall, and a plurality of ribs along the outer surface of the membrane body, each of the plurality of ribs extending axially along the membrane side wall and radially along the membrane bottom wall.

* * * * *